(12) United States Patent
Spratt et al.

(45) Date of Patent: Dec. 29, 2020
(10) Patent No.: US 10,875,140 B2

(54) MANUFACTURING METHOD FOR MANUFACTURING A SPECTACLE LENS, SPECTACLE LENS AND LENS DESIGN METHOD

(71) Applicant: Carl Zeiss Vision International GmbH, Aalen (DE)

(72) Inventors: Ray Steven Spratt, Petaluma, CA (US); Angela Nolan, Black Forrest (AU); Philipp Ellinger, Hallet Cove (AU); Michael Gall, Aberfoyle Park (AU)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/883,992

(22) Filed: May 26, 2020

(65) Prior Publication Data
US 2020/0282507 A1 Sep. 10, 2020

Related U.S. Application Data

(63) Continuation of application No. PCT/EP2018/083059, filed on Nov. 29, 2018, which
(Continued)

(51) Int. Cl.
*B24B 13/00* (2006.01)
*B24B 13/06* (2006.01)
*G02C 7/02* (2006.01)

(52) U.S. Cl.
CPC .......... *B24B 13/0037* (2013.01); *B24B 13/06* (2013.01); *G02C 7/027* (2013.01)

(58) Field of Classification Search
CPC ..... B24B 13/0037; B24B 13/06; G02C 7/024; G02C 7/027
(Continued)

(56) References Cited

U.S. PATENT DOCUMENTS 4,561,736 A  12/1985  Fuerter et al.
4,861,153 A   8/1989  Winthrop
(Continued)

FOREIGN PATENT DOCUMENTS

DE  10315008 A1  1/2005
EP   2117774 B1  1/2011
(Continued)

OTHER PUBLICATIONS

International Preliminary Report on Patentability issued in PCT/IB2017/001580, to which this application claims priority, dated Jun. 11, 2020.
(Continued)

*Primary Examiner* — George B Nguyen
*Assistant Examiner* — Alberto Saenz
(74) *Attorney, Agent, or Firm* — Thrive IP®; Georg M. Hasselmann

(57) ABSTRACT

A manufacturing method for manufacturing a spectacle lens is disclosed. The method includes: obtaining prescription data descriptive of an ophthalmic prescription of a user in the plus prescription range; obtaining frame data descriptive of a perimeter of a spectacle frame in which the lens is to be mounted; providing a lens blank having a convex front surface and a back surface; determining a final cutting surface to be machined on the back surface of the lens blank in a final cutting phase; and determining an intermediate cutting surface to be machined on the back surface of the lens blank in an initial cutting phase. Further, it is provided that the intermediate cutting surface is different from the final cutting surface; and the final cutting surface comprises a prescription zone in which the final cutting surface together with the front surface fulfills the ophthalmic prescription of the user.

15 Claims, 13 Drawing Sheets

Related U.S. Application Data is a continuation of application No. PCT/IB2017/001580, filed on Nov. 29, 2017.

(58) Field of Classification Search
USPC .................. 351/159.73, 159.74; 700/157
See application file for complete search history.

(56) References Cited

U.S. PATENT DOCUMENTS

| | | | |
|---|---|---|---|
| 6,743,486 | B1 | 6/2004 | Miyazawa |
| 8,523,633 | B2 | 9/2013 | Schneider et al. |
| 8,685,292 | B2 * | 4/2014 | Mandler .............. B24B 13/005 |
| | | | 264/1.32 |
| 9,434,043 | B2 | 9/2016 | Duersteler Lopez et al. |
| 9,459,467 | B2 | 10/2016 | Espinola Estepa et al. |
| 2002/0160690 | A1 * | 10/2002 | Miyazawa ................ B24B 1/00 |
| | | | 451/5 |
| 2006/0073771 | A1 | 4/2006 | Mandler et al. |
| 2007/0229756 | A1 | 10/2007 | Mandler et al. |
| 2008/0026679 | A1 | 1/2008 | Siders et al. |
| 2013/0107205 | A1 | 5/2013 | Weatherby |
| 2016/0091733 | A1 * | 3/2016 | Moine .............. B29D 11/00961 |
| | | | 351/159.75 |

FOREIGN PATENT DOCUMENTS

| | | |
|---|---|---|
| EP | 2236244 B1 | 1/2014 |
| ES | 2427859 B1 | 11/2014 |
| WO | 2015178916 A1 | 11/2015 |
| WO | 2017089239 A1 | 6/2017 |

OTHER PUBLICATIONS

International Preliminary Report on Patentability issued in PCT/EP2018/083059, to which this application claims priority, dated Nov. 6, 2019.

"Ophthalmic optics—Spectacle lenses—Vocabulary (ISO 13666:2012)," German and English version EN ISO 13666:2012, Oct. 2013.

International Search Report of the International Searching Authority issued in PCT/EP2018/083059, to which this application claims priority, dated Apr. 17, 2019.

Written Opinion of the International Preliminary Examining Authority (WO/IPEA) issued in PCT/EP2018/083059, to which this application claims priority, dated Apr. 17, 2019.

\* cited by examiner

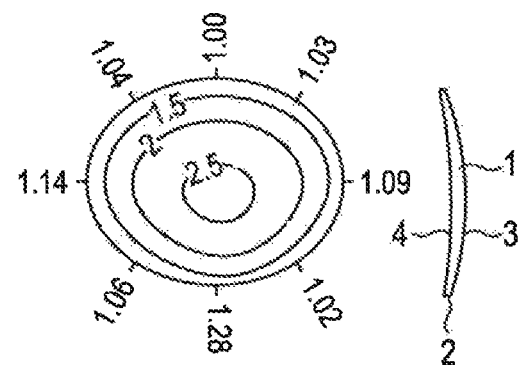
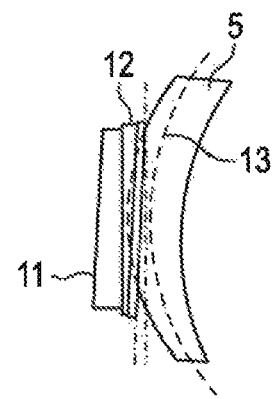
FIG. 1  FIG. 2
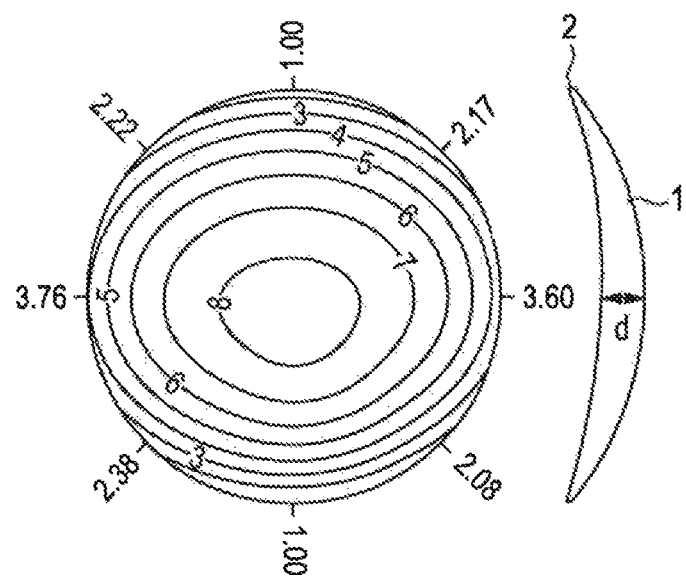
FIG. 3

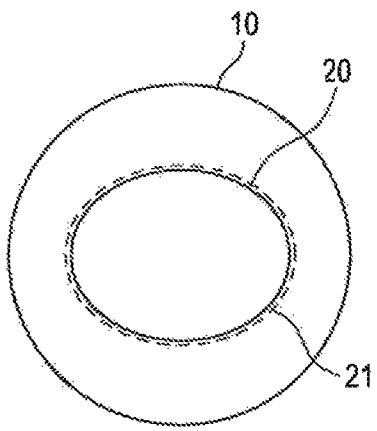
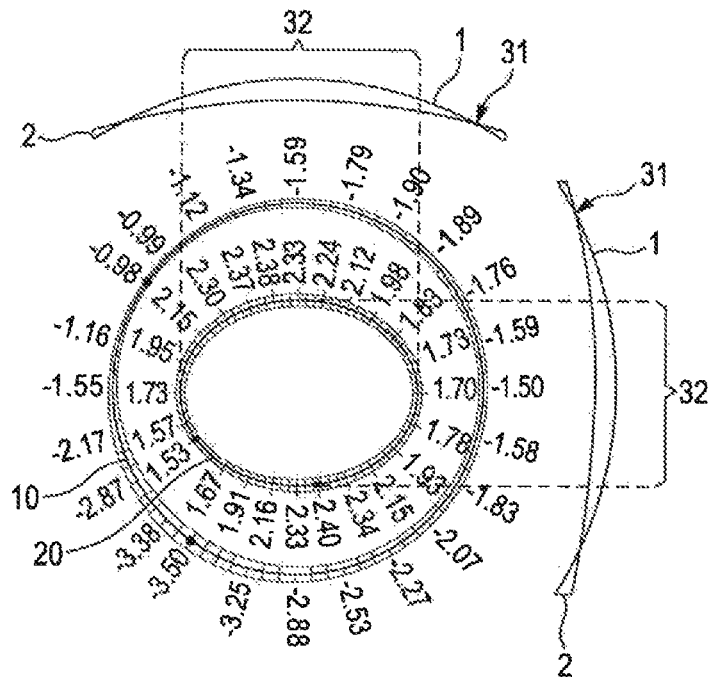
FIG. 4    FIG. 5A
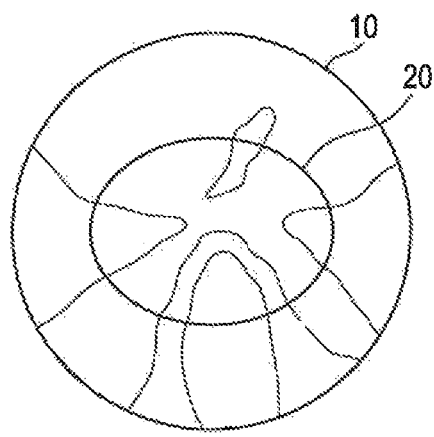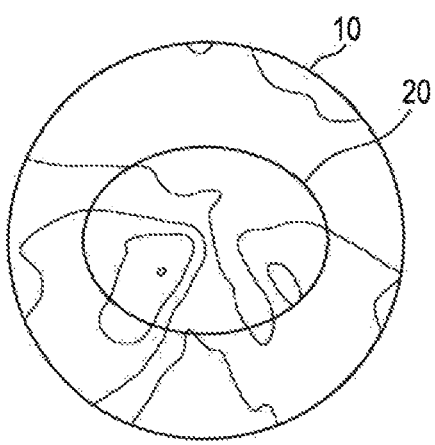
FIG. 5B

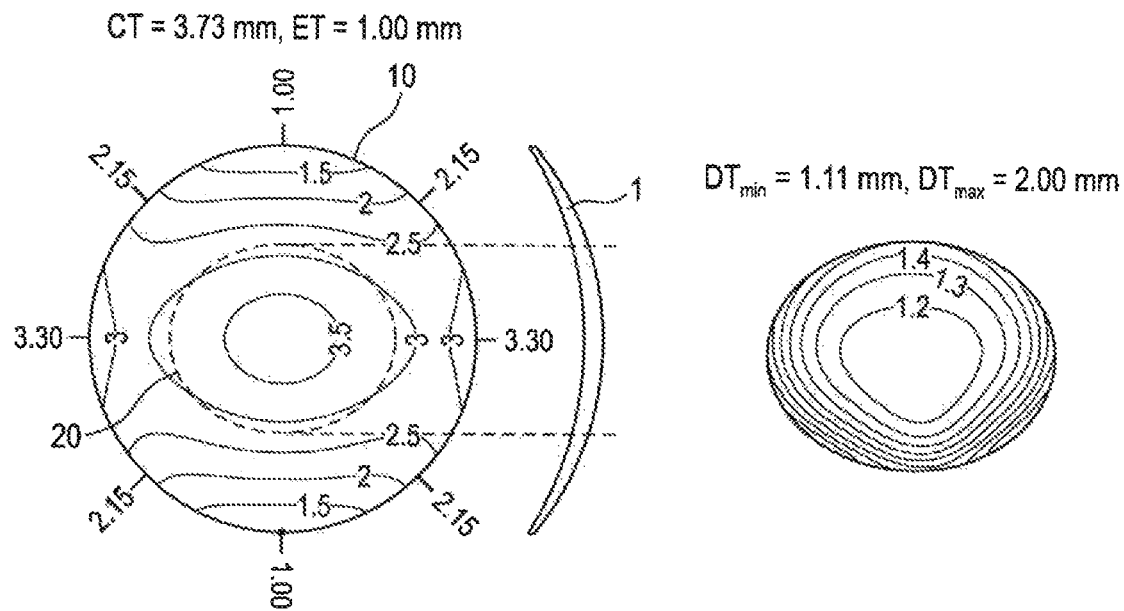
FIG. 18                    FIG. 19
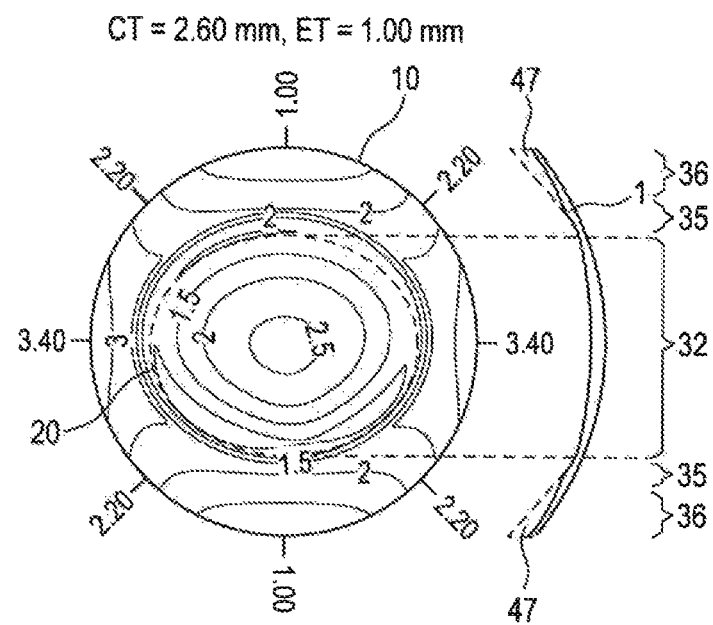
FIG. 20

MANUFACTURING METHOD FOR MANUFACTURING A SPECTACLE LENS, SPECTACLE LENS AND LENS DESIGN METHOD

CROSS REFERENCE TO RELATED APPLICATIONS

This application is a continuation application of international patent application PCT/EP2018/083059, filed Nov. 29, 2018, designating the United States and claiming priority from international patent application PCT/IB2017/001580, filed Nov. 29, 2017, and designating the United States, and the entire content of both applications is incorporated herein by reference.

FIELD OF THE DISCLOSURE

The present disclosure relates to manufacturing ophthalmic lenses, more specifically to manufacturing of ophthalmic lenses in the plus prescription range. In particular, the present disclosure relates to a manufacturing method for manufacturing a spectacle lens. The present disclosure further relates to a spectacle lens, a method for designing a spectacle lens and a corresponding computer program.

BACKGROUND

As described in U.S. Pat. No. 9,434,043 B2, usually ophthalmic lenses are made from semi-finished lens blanks. Semi-finished lens blanks usually have a circular outer perimeter and include one convex face (away from the user's eye) and one concave face (near the user's eye). Semi-finished lens blanks are produced by combining particular concave faces and particular convex faces.

In order to manufacture an ophthalmic lens that fulfills a particular prescription, an "approximate" semi-finished lens blank is used and at least one of its faces is machined in a "surfacing" process so that the surfaced lens fulfills the pre-established prescription. This process normally requires both cutting and polishing steps.

As part of the cutting process the lens diameter is normally cribbed from that of the semi-finished blank to a circular, elliptical or complex shape that is not smaller than the frame associated with the pre-established prescription. The resulting lens is referred to as a "finished uncut."

After lens polishing, and after any applicable coating processes have been applied, the final step is to glaze the lens to the frame using an edging process, in which the excess diameter of the finished uncut shape is removed, producing a circumferential size and shape matching the frame. During this step a suitable bevel edge profile may be applied to enable a secure fit of the lens within the frame.

Generally, lenses can be grouped into two large families. On the one hand, negative prescription lenses are those where the curvature radius of the concave surface is less than the curvature radius of the convex surface. Therefore, negative prescription lenses have a thickness that increases moving away from the optical axis. On the other hand, positive prescription lenses are those where the curvature radius of the concave surface is greater than the curvature radius of the convex surface, or it can even be an opposite sign. In this latter case, the thickness of the lens decreases when moving away from the optical axis. Most ophthalmic lens prescriptions are not spherical but include cylinder, which requires different surface curvatures in different axial directions, and the resulting lens thickness will vary circumferentially. Finally, progressive prescription lenses which provide an additional sphere power in a localized reading portion of the lens will have the lens thickness vary in a complex way from one point to another on the same lens.

By machining the semi-finished lens blank so that it fulfills a particular pre-established prescription, there may be problems with the thickness of the outer perimeter of the finished lens. In the case of negative prescription lenses the edge thickness can become very large. In the case of positive prescription lenses, the lens edge thickness may become excessively fine or theoretically negative. For these positive prescription lenses, a positive thickness at the desired perimeter cannot be maintained for a specified center thickness. If machined to the specified center thickness, these lenses might not achieve the desired circumferential shape but instead might have "recesses" in the perimeter, and/or would have extremely sharp thin edges. All this hinders the subsequent handling of the finished uncut lens, firstly because conventional methods and machinery have been designed to process finished lenses with a regular outer perimeter, secondly because thin edges are prone to breakage, and thirdly because a sharp lens edge may damage the soft polishing pads and/or cause manual handling cuts.

For the purpose of automated lens manufacturing, it would be preferable to produce all lenses to a circular shape with identical diameter regardless of prescription. This diameter may be equal to the largest diameter needed to cover any spectacle frame. This would simplify automated systems for robotic processing and handling of lenses.

Moreover, there is a need to manufacture ophthalmic lenses as slim as possible, both to minimize the weight and also for aesthetical reasons.

In this context, U.S. Pat. No. 9,434,043 B2 discloses a method of machining an ophthalmic lens having one concave face and one convex face and an outer perimeter, where the outer perimeter has a thickness within a pre-established range, the method comprising: (a) defining a central area with a perimeter that coincides with a perimeter of a pre-established frame and wherein the central area is a progressive lens; (b) defining a surface to be machined on one of the concave and convex faces, so that the concave and convex faces jointly fulfill a pre-established ophthalmic prescription in the central area; (c) positioning the surface to be machined, arranged on the one of the concave and convex faces, with respect to the other of the concave and convex faces, so that the surface to be machined and the position of the surface to be machined with respect to the other of the concave and convex faces determines the thickness of the lens along the perimeter in the central area; (d) defining a transition area with a transition surface that extends between the perimeter of the central area and the outer perimeter, wherein the transition surface extends from the surface to be machined as far as the outer perimeter, and wherein the transition surface is continuous and a derivative thereof is continuous on all points, including a joining line between the transition surface and the surface to be machined; and (e) machining the transition surface in the surface to be machined of the ophthalmic lens.

Regarding the manufacturing process, U.S. Pat. No. 9,434,043 B2 further teaches that the step (d) may comprise specifying a minimum curvature radius of a tool used to machine the transition surface, and defining the transition surface to have a main minimum curvature radius on all points, which is greater than the minimum curvature radius of the tool.

US 2016/0091733 A1 discloses a method for locally thickening an ophthalmic lens.

US 2002/0160690 A1 discloses a method of producing lenses. A lens surface shape is created by a near-finish surface forming rough-cutting step of creating a near-finish surface shape analogous to a lens surface shape based on a prescription of a spectacle lens from a spectacle lens base material by numerically controlled cutting.

U.S. Pat. No. 6,743,486 B1 discloses a further method for producing a spectacle lens. It is suggested that production information such as an edging mark indicating a region of the lens remaining after edging and reference position marks are depicted in a region to be cut off by the edging of a surface of a lens for spectacles.

DE 103 15 008 A1 discloses a method and device for manufacturing spectacle lenses and other formed bodies with optically effective surfaces.

US 2013/0107205 A1 discloses a method for making a prescription lens.

US 2007/0229756 A1 discloses a method for manufacturing ophthalmic lenses using circular blanks.

SUMMARY

It is an object of the present disclosure to provide a method for manufacturing a spectacle lens from a lens blank that overcomes one or more disadvantages of the related art. In particular, it would be desirable to provide a manufacturing method that enables more efficient and economical lens manufacturing. It would further be desirable to increase the manufacturing speed, to allow the use of a single lens blocking specification, and to support the use of an automated system for robotic handling of lenses.

To better address one or more of these concerns, according to a first aspect of the present disclosure, a manufacturing method of manufacturing a spectacle lens is provided, the method comprising the steps of:

obtaining prescription data descriptive of an ophthalmic prescription of a user (in the plus prescription range);

obtaining frame data descriptive of a perimeter of a spectacle frame (in which the spectacle lens is to be mounted);

providing a lens blank having a convex front surface and a (concave) back surface;

determining a final cutting surface to be machined on the back surface of the lens blank in a secondary cutting phase;

determining an intermediate cutting surface to be machined on the back surface of the lens blank in a primary cutting phase, wherein the intermediate cutting surface is different from the final cutting surface;

wherein the final cutting surface comprises
  a prescription zone, in which the final cutting surface together with the front surface fulfills the ophthalmic prescription of the user; and wherein a boundary perimeter of the prescription zone encloses the perimeter of the spectacle frame; and
  a non-prescription blending zone surrounding the prescription zone; in which the final cutting surface together with the front surface provides at least a predetermined minimum thickness of the spectacle lens;

wherein the intermediate cutting surface is determined based on the final cutting surface; wherein a maximum curvature of the intermediate cutting surface is smaller than a maximum curvature of the final cutting surface; and wherein a lens thickness provided by the intermediate cutting surface exceeds a lens thickness provided by the final cutting surface at least within the prescription zone;

machining the intermediate cutting surface on the back surface of the lens blank in the primary cutting phase, and machining the final cutting surface on the back surface of the lens blank in the secondary cutting phase.

In an exemplary embodiment, the non-prescription blending zone can provide a transition from the prescription zone to a remainder of the intermediate cutting surface machined on the back surface. The prescription zone can be smaller than the intermediate cutting surface machined on the back surface. Hence, a remainder or residual portion may remain on the back surface after machining the final cutting surface. An advantage can be an improved manufacturing efficiency. In view of increasing processing power this can outweigh the drawback of an increase computational effort.

In lens manufacturing, the machining process of the surface may involve one or more cutting steps, using one or more different cutting tools. The machined surface shape is traditionally the same for all cutting steps but the result of the cutting steps differ in the amount of material removed and the resulting surface quality. For a freeform surfacing process the surface quality resulting from this cutting process must support polishing with a soft pad polishing process. So, for example, a freeform surfacing process may use an initial cutting step with a coarse cutting tool that removes the bulk of unwanted material in a rapid process but giving low surface quality, followed by a final slower cutting step with a fine cutting tool that removes little material but giving good surface quality. In this way the lens thickness is efficiently reduced from the semi-finished blank to that of the finished lens, and from the semi-finished surface shape to the surface shape of the finished lens, with sufficient surface quality to support the subsequent polishing process.

The present disclosure is based on the idea of determining an additional intermediate cutting surface based on the final cutting surface having relaxed requirements for the manufacturing process. Hence, instead of only specifying a final target or cutting surface to be machined based on strict requirements regarding the maximum curvature to be cut, the suggested method enables more efficient and economical manufacturing of a spectacle lens. Instead of an intermediate cutting surface and a final cutting surface, reference can also be made to a first pass cutting surface and a second pass cutting surface. The intermediate cutting surface is different from the final cutting surface. Moreover, for the final cutting surface it may not be necessary to machine an entire back surface of a lens blank such that the machined back surface together with the front surface fulfills the ophthalmic prescription of the user but it is sufficient to fulfill the ophthalmic prescription of the user inside a prescription zone. It is to be understood that the final cutting surface is thus, at least in part, machined on the back surface of the lens blank after machining the intermediate cutting surface on the back surface of the lens blank, i.e., not on the unprocessed lens blank. The boundary perimeter of the prescription zone encloses the perimeter of the spectacle frame to be worn by the user. The prescription zone can be surrounded by a non-prescription zone or non-prescription blending zone which provides a transition from the prescription zone to a remainder of the back surface. In order to provide sufficient stability the non-prescription blending zone is configured such that this surface together with the front surface provides at least a predetermined minimum thickness of the spectacle lens.

The solution proposed herein is particularly advantageous when manufacturing complex geometries such as freeform surfaces. As described in the afore-mentioned U.S. Pat. No. 9,434,043 B2, the minimum curvature radius of a tool used to machine a final surface may be a limiting factor and the respective surface is limited in that a minimum radius is required on all points of the surface, which is greater than the radius of the cutting tool. Hence, it would be desirable to use a small cutting tool to provide increased design flexibility and potentially improved optical surfaces. However, taking into consideration that the tool diameter may also limit a depth of cut, the processing time may increase significantly. Hence, the inventors recognized that there is a trade-off between machinability and processing time which has to be weighed against the possibility of closely achieving a desired target surface.

The solution disclosed herein overcomes these problems by specifying an intermediate cutting surface in addition to the final cutting surface to be machined on the back surface of the lens blank. Since the minimum radius of the intermediate cutting surface is larger than a minimum radius of the final cutting surface, the manufacturability is improved. In particular, a larger diameter tool can be used for quick material removal such that the processing time can be reduced. Nonetheless, a lens thickness provided by the intermediate cutting step exceeds a lens thickness provided by the final cutting step at least within the prescription zone. Hence, the desired high surface quality can be maintained in particular in the area where it is actually needed, namely within the prescription zone.

Thereby, the proposed solution provides a manufacturing method that enables more efficient and economical lens manufacturing. In particular, the manufacturing speed can be increased while still allowing the use of a single lens blocking specification and further supporting and not conflicting with the use of an automated system for robotic handling of (standardized) lenses or lens diameters.

The prescription zone may have a non-zero through power, in particular, the prescription zone may provide plus power. The machining may comprise a turning process. The prescription zone may smoothly blend with the non-prescription blending zone for example to avoid discontinuities in manufacturing. In particular, the surface height and/or slope at the transition between the prescription zone and the non-prescription blending zone may be continuous. A minimum radius of the intermediate cutting surface may be large enough to be cut with a fast milling tool.

The inventors recognized that the spectacle lens may be manufactured more efficiently by overcoming the requirement for a single non-prescription zone that has to be continuous in surface slope. Hence, two non-prescription zones may be provided that surround the prescription zone, wherein a transition between the first non-prescription (blending) zone and the second non-prescription (peripheral) zone may at least in part be discontinuous in surface slope. For example, if the final surface has height below the intermediate surface only within the optical bowl and the non-prescription blending zone, then the intermediate surface will remain at the outer non-prescription (peripheral) zone, and the boundary between the two will be discontinuous. This could enable the non-prescription peripheral zone to be manufactured with a primary (coarse) cutting tool leaving only the central prescription zone and at least part of the non-prescription blending zone to be manufactured with a secondary (fine) cutting tool.

According to a third aspect there is provided a method, in particular a computer-implemented method, for designing a spectacle lens. The method comprises the steps of:
obtaining prescription data descriptive of an ophthalmic prescription of a user in the plus prescription range;
obtaining frame data descriptive of a perimeter of a spectacle frame in which the lens is to be mounted;
determining a final cutting surface to be machined on the back surface of a lens blank in a secondary cutting phase;
determining an intermediate cutting surface to be machined on the back surface of the lens blank in a primary cutting phase, wherein the intermediate cutting surface is different from the final cutting surface;
wherein the final cutting surface comprises
a prescription zone, in which the final cutting surface together with the front surface fulfills the ophthalmic prescription of the user; and wherein a boundary perimeter of the prescription zone encloses the perimeter of the spectacle frame; and
a non-prescription blending zone surrounding the prescription zone; in which the final cutting surface together with the front surface provides at least a predetermined minimum thickness of the spectacle lens;
wherein the intermediate cutting surface is determined based on the final cutting surface; wherein a maximum curvature of the intermediate cutting surface is smaller than a maximum curvature of the final cutting surface; and wherein a lens thickness provided by the intermediate cutting surface exceeds a lens thickness provided by the final cutting surface at least within the prescription zone.

According to a fourth aspect a computer program is provided comprising program code means for causing a computer to carry out the steps of the method according to the third aspect when the computer program is carried out on a computer or processing unit.

According to a further aspect, there is provided a machine readable, in particular non-transitory, storage medium having stored thereon a computer program comprising program code means for carrying out the steps of the method according to the third aspect.

Exemplary embodiments of the disclosure are defined below. It shall be understood that the claimed manufacturing method, spectacle lens, design method, computer program, and storage medium can have similar and/or identical refinements or exemplary embodiments as the claimed manufacturing method or the lens manufacture.

In the following, some terms which are used throughout the application shall be shortly explained and defined. Unless otherwise indicated, the terminology used in the context of the present application corresponds to the definitions in the standard DIN EN ISO 13666: 2013-10 of the DIN (Deutsches Institut für Normung e.V.).

The term front surface or front of a lens or lens element shall refer to that surface of the lens intended to be fitted away from the eye, cf. No. 5.8 of the standard DIN EN ISO 13666. The term back surface of back of the lens shall refer to that surface of the lens intended to be fitted nearer to the eye, cf. No. 5.9 of the standard DIN EN ISO 13666.

The term geometrical center may in particular refer to an intersection of horizontal and vertical centerlines of the rectangular box, which circumscribes the shape of the lens blank or uncut lens, similar to No. 5.5 of the standard DIN EN ISO 13666.

The term fitting point shall refer to that point on the front surface of a lens or semi-finished lens blank stipulated by the manufacturer as a reference point for positioning the lens in front of the eye, cf. No. 5.24 of the standard DIN EN ISO 13666.

The term lens blank as used herein shall refer to a piece of material, usually preformed, for the making of a lens at any stage before completion of the surfacing, cf. No. 8.4.1 of the standard DIN EN ISO 13666. As used herein, the term lens blank may also be used as an abbreviation for a semi-finished lens blank already having one optically finished surface, cf. No. 8.4.2 of the standard DIN EN ISO 13666. The term finished lens shall refer to a lens of which both sides have their final optical surface, cf. No. 8.4.6 of the standard DIN EN ISO 13666. The finished lens can be beveled, edged or glazed (to adjust its perimeter to a particular frame) or not. As used herein a finished lens or spectacle lens refers to a non-edged or unbeveled lens, unless stated otherwise.

The term spherical surface shall refer to a part of the inside or outside surface of a sphere, cf. No. 7.1 of the standard DIN EN ISO 13666. The term aspherical surface shall refer to a part of a surface of revolution having continuously variable curvature from the vertex to the periphery, cf. No. 7.3 of the standard DIN EN ISO 13666. The term toroidal surface shall refer to a surface having mutually perpendicular principal meridians of unequal curvature, of which the cross-section in both principal meridians is nominally circular, cf. No. 7.5 of the standard DIN EN ISO 13666. For example, this is part of the surface can be generated by a circular arc rotating about an axis which is in the same plane as the arc, but which does not pass through its center of curvature. The term atoroidal surface shall refer to a surface having mutually perpendicular principal meridians of unequal curvature, of which the cross-section in at least one principal meridian is not circular, cf. No. 7.6 of the standard DIN EN ISO 13666.

The term optical axis generally refers to a straight line, perpendicular to both optical surfaces of a spectacle lens, along which light can pass undeviated, cf. No. 4.8 of the standard DIN EN ISO 13666. It should be noted for aspheric or freeform surfaces, as may be used in accordance with the present disclosure, there may not be a true optical axis within the meaning of No. 4.8 of the standard. As used herein, the term optical axis shall therefore refer to the direction of view in as worn position or the line of sight or visual axis the wearer looks through the spectacle lens to a distant object in an as-worn orientation. In other words, reference can be made to the main fixation direction as the most common direction of the line of sight relative to the primary position, cf. No. 5.33 of the standard. The primary position shall refer to the position of the eye relative to the head, looking straight ahead at an object at eye level, cf. No. 5.31 of the standard DIN EN ISO 13666.

The term edge thickness refers to the thickness at a point on the edge of a lens, cut or uncut, measured approximately parallel to the optical axis, cf. No. 8.1.15 of the standard DIN EN ISO 13666. The thickness may also be described at other points such as a maximum thickness within the prescription zone, a thickness along the boundary perimeter of the prescription zone.

As used herein, a large curvature corresponds to a small radius surface shape, whereas a small curvature corresponds to a large radius surface shape. The curvature can be given in diopters. Unless otherwise specified, the curvature in diopters is linked to the radius of curvature by a standard index of refraction of 1.530. For a (spherical) shape, the relation between the curvature and the radius of curvature is given by $r=(n-1)/C=(1.53-1)/C$, wherein r is the radius of curvature in millimeters, n=1.53 the assumed fixed refractive index and C the curvature in diopters.

In an exemplary embodiment, the intermediate cutting surface can optionally be one of a toric surface, an aspheric surface or a smoothed final cutting surface. An advantage of this exemplary embodiment is that it may enable fast and easy manufacturing of the intermediate cutting surface. The smoothed final surface can be determined from the final cutting surface with modifications to reduce peak curvature and lessen irregularities. Hence, for example a larger diameter cutting tool may be used for manufacturing the intermediate cutting surface than for the final cutting surface. The smoothed final cutting surface may also be referred to as a smoothed modification or version of the final cutting surface.

Optionally, for at least one point of the final cutting surface, a meridian curvature of the intermediate cutting surface may correspond to a meridian curvature of the final cutting surface in that point. Typically, both principal meridians of the intermediate cutting surface correspond to both principal meridians of the final cutting surface. The point can be a point within the prescription zone. For example, the point may be a fitting point within the prescription zone. An advantage of this exemplary embodiment is that the intermediate cutting surface may closely approximate a shape of the final cutting surface. Hence, less material may have to be removed in a slow final cutting phase.

Optionally, the intermediate cutting surface can be adapted to be machined with a primary coarse cutting tool and the final cutting surface can be adapted to be machined with a secondary fine cutting tool. For example, the primary coarse cutting tool can be a milling tool having a large cutting radius, e.g., having a radius of 33 mm. The fine cutting tool may be smaller radius, such as a polycrystalline diamond (PCD) cutting plate, e.g., having a radius of 8 mm, or a monocrystalline diamond (MCD) e.g., having a radius of 5 or 2 mm. The cutting radius of the respective fine and coarse cutting tools can define a maximum allowable curvature of the intermediate and final cutting surfaces. The respective surfaces may be manufactured using a freeform generator.

If the height difference between the intermediate and final surfaces is greater than the depth of cut of the chosen fine cutting tool, it may be necessary to perform multiple cuts to achieve the final surface. Optionally, machining the final cutting surface in the secondary cutting phase can comprise a first sub-phase and a second sub-phase, wherein in the first sub-phase the final surface shape is machined with a height offset using the secondary cutting tool, and wherein in the second-sub-phase the final surface shape is machined without height offset using a ternary or finishing cutting tool.

Optionally, machining the final cutting surface can be achieved by successive cuts using both a PCD (polycrystalline diamond cutting tool) and MCD (monocrystalline diamond cutting tool). For example, to make the first cut of the final surface, the PCD plate with a suitable height offset is used; then the final cut is performed with the smaller diameter MCD tool. In this way the larger depth of cut of the PCD would enable removal of gross differences in shape between the intermediate and final surfaces, leaving only a constant small depth of cut for the MCD to complete the surfacing task. An advantage of this exemplary embodiment is that a high surface quality may be achieved in a small number of cutting steps thereby reducing, typically minimizing the process time.

Optionally, a surface height difference between the intermediate cutting surface and the final cutting surface to be machined in the prescription zone is within a predetermined thickness (or height difference) range. For example, the minimum thickness threshold may be set to 0.2 mm. This would provide sufficient depth of cut for the final fine cut to completely remove the coarser previous cut and provide a quality surface finish within the prescription zone. Typically, a maximum surface height difference between the intermediate cutting surface and the final cutting surface is below a second predetermined threshold. An advantage of this exemplary embodiment is that the remaining material can be removed in a small number of final cutting passes, thereby reducing the manufacturing time.

Optionally, determining the final or intermediate cutting surface can comprise incorporating a prism into the final or intermediate surface. For example, the lens blank can be mounted on a prism mount for machining or prism tilt can be incorporated into the final and/or intermediate cutting surfaces. For example, incorporating a prism in the intermediate cutting surface may enable the intermediate cutting surface to more closely match the final cutting surface while still being able to manufacture the intermediate cutting surface conveniently. Incorporating a prism into the final cutting surface may enable a thinner lens by prism thinning, in particular in case the ophthalmic prescription describes a progressive lens.

Optionally, the spectacle lens may have a thickness within a predetermined thickness range along a boundary perimeter of the prescription zone, typically along the perimeter of the spectacle frame. Optionally, a minimum thickness of the spectacle lens along a boundary perimeter of the prescription zone is within a predetermined thickness range. For example, the predetermined thickness can be between 0.5 mm and 2 mm, typically between 0.75 mm and 1.5 mm, more typically 1 mm (±25%, particularly ±10%). A low thickness advantageously reduces the weight of the spectacle lens. However, in particular when manufacturing freeform surfaces, a certain minimum thickness is advantageous to support the lens manufacturing processes.

Optionally, the final cutting surface can be determined under the boundary condition of minimizing a maximum thickness of the spectacle lens in the prescription zone while achieving or providing/maintaining a predetermined thickness range along the boundary perimeter of the prescription zone. This can be achieved by numerical optimization. An advantage of this exemplary embodiment is that a lightweight lens can be provided while at the same time being stable enough to ensure good glazing and handling and polishing. The final cutting surface can be determined by automated numerical optimization under the given boundary conditions to be provided as an input for the automatic optimization procedure. Advantageously, prism thinning may be applied.

Optionally, the final cutting surface and the intermediate cutting surface intersect outside of the prescription zone along an intersection curve. Typically, the final cutting surface is machined only inside the intersection curve, a sub-area of the intermediate cutting surface that encompasses the intersection curve or inside a typically circular diameter (area) that encompasses the intersection curve. Hence, there is no need to manufacture the final cutting surface outside the intersection curve in a non-prescription peripheral zone. Thereby, the manufacturing speed can be further increased and the wear of the cutting tools for fine machining can be reduced. It will be understood, that there is no need to machine the final cutting surface outside the intersection curve, since it is positioned higher than the intermediate surface in this region, and the tool would be "air-cutting." Hence, the resulting spectacle lens may provide essentially three zones comprising an inner prescription zone followed by a non-prescription blending zone surrounding the prescription zone and a non-prescription peripheral zone surrounding the non-prescription blending zone. The non-prescription peripheral zone is typically only machined based on the intermediate cutting surface. It shall be understood that the intersection curve may have circular shape. The intersection curve may be positioned centered with respect to a center of rotation. This may further facilitate the manufacturing process. In particular, since this outer non-prescription peripheral zone does not form part of the finished spectacle lens after edging, there is no need for a high surface quality. This may further reduce the manufacturing cost.

Optionally, the final cutting surface in the non-prescription blending zone may be steeper than the intermediate cutting surface in at least one point of the non-prescription blending zone. Hence, on the surface of the finished uncut lens, a transition between the non-prescription blending zone and the non-prescription peripheral zone may at least in part be discontinuous in surface slope in a radial direction.

Optionally, the boundary perimeter comprising the frame perimeter may correspond to a smoothed frame perimeter, typically a circle or ellipse encompassing the frame perimeter. However, also other smoothed versions of the frame perimeter can be used. An advantage of this exemplary embodiment is that by using a smoothed boundary perimeter, a more favorable shape for manufacturing the spectacle lens in particular using a turning process can be provided. Hence, instead of starting from a frame that may have rapidly varying shape such as sharp corners, a smoothed version is considered.

Optionally, the prescription zone may be centered on the lens blank. In conventional manufacturing, usually the optical center is aligned with the center of the geometric center of the lens blank. In contrast thereto, an intentional misalignment is proposed such that the frame is approximately centered with the geometric center of the lens blank. For example, a circumcenter (which is the center of the circle that encompasses the prescription zone) or a centroid or geometric center of the prescription zone can be aligned with a center of the lens blank. An advantage of this exemplary embodiment is that an area for the fine processing of the final cutting surface may be reduced to a central portion of the lens blank. For example, an outer portion of the lens blank may only be machined with a coarse cutting tool and no fine cutting, and the fine cut may be required only over the central reduced diameter. Hence, the manufacturing speed may be further increased.

Optionally, a position of the prescription zone on the lens blank can be selected under the condition of minimizing variations in sagittal curvature within the non-prescription blending zone. The sagittal curvature refers to the rotational direction (as opposed to a radial direction) and is relevant to cutting via a turning process. An advantage of this exemplary embodiment is the manufacturing or cutting speed can be increased. It will be appreciated that such a position can be determined by experimental positioning or numerical automatization procedures wherein the optimization is performed under the afore-mentioned boundary condition.

Optionally, the final cutting surface outside of the prescription zone can be optimized to minimize variations in sagittal curvature within the non-prescription blending zone using a surface fitting and smoothing process. An advantage of this exemplary embodiment is an increased manufacturing speed via a turning cutting process.

Turning now to the spectacle lens, optionally, the non-prescription peripheral zone can at least in part be (generally) plano. According to DIN EN ISO 13666, a plano lens (or zone thereof) has nominally zero dioptric power. In other words, in the non-prescription peripheral zone, the convex front surface and the final cutting surface may be substantially parallel. Hence, an extension to the prescription zone can be provided that extends the lens to a standardized size which thereby simplifies automated processing and handling of the spectacle lens (before edging).

Optionally, a curvature of the final cutting surface at least for portions of the non-prescription blending zone or peripheral zone corresponds to a curvature of the convex front surface. Hence, the back surface and the front surface may have substantially the same shape. An advantage of this exemplary embodiment is that the shape can be easily calculated by simply adding a height offset to the convex front surface.

It is to be understood that the features mentioned above and those yet to be explained below may be used not only in the combination respectively indicated, but also in other combinations or separately, without departing from the scope of the present disclosure.

BRIEF DESCRIPTION OF THE DRAWINGS

These and other aspects of the disclosure will be apparent from and elucidated with reference to the exemplary embodiments described hereinafter. In the following drawings FIG. 1 shows a schematic contour plot of lens thickness and cross-sectional view of a plus lens;

FIG. 2 shows a schematic diagram of mounting a lens blank on a manufacturing block, including prism in the mounting;

FIG. 3 shows a second lens thickness contour plot and cross sectional view of a plus sphere lens having a standardized diameter;

FIG. 4 shows the centralized positioning of a frame contour within a lens blank of standardized diameter;

FIG. 5A shows an example of the theoretical edge thickness when providing a thin lens where the lens edge thickness reduces below zero inside the standard diameter;

FIG. 5B shows a diagram of the surface mean power (left) and cylinder (right) corresponding to this lens, the Rx of which has both sphere and cylinder power and a progressive addition;

FIG. 18 shows the shape of a spectacle lens after machining the intermediate cutting surface;

FIG. 19 shows a thickness difference inside the prescription zone;

FIG. 20 shows the final thickness of a spectacle lens along the vertical meridian after machining the intermediate cutting surface;

DESCRIPTION OF PREFERRED EXEMPLARY EMBODIMENTS

Figure 6:
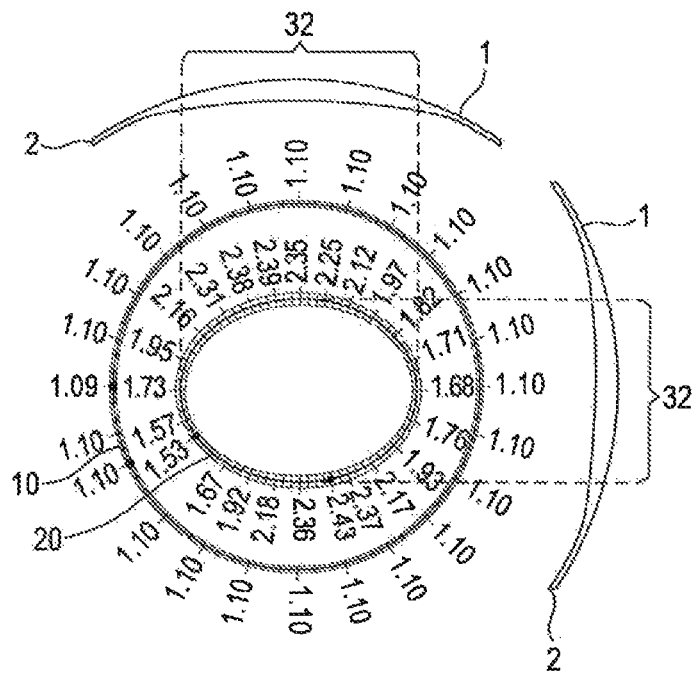
FIG. 6 shows a modification of this lens shape with increased peripheral thickness to avoid negative thicknesses.

The present disclosure relates to the manufacture of spectacle lenses and in particular to freeform surfacing of prescription lenses. In this process a (semi-finished) lens blank is used as the starting point. Generally, this lens blank has the correct convex, in particular spherical, front surface required for the final lens. However, the lens diameter and thickness of such a standardized lens blank are typically larger than required. Furthermore, the back surface may have some fixed nominal curvature that is not adapted to the prescription of the user yet. During the surfacing process, the lens may be held by the front surface and the back surface can be cut and polished to the required shape to achieve the desired lens thickness and optical characteristics required for the prescription being ordered. The lens may be a single vision or multifocal. Hence, the back surface shape may be spherical, aspheric, toric, atoric or complex. Optionally, both sides of the lens may be surfaced, for example with freeform front surface progressive lenses having an individually optimized progressive surface on the front and a simple toric on the back.

FIG. 1 shows a contour plot of a thickness of a commercially available plus spectacle lens 1. In the given example, the lens 1 is back surface progressive lens having prescription+3/−1 @ 90, 2.50 add, i.e., a plus 3 D (diopters) sphere lens having a minus 1 D cylinder at 90° and a plus 2.50 D add power progressive lens portion. In the given example, the refractive index of the material used is 1.499. The front surface 3 of the lens is a sphere having a radius of 64.09 mm, corresponding to 8.27 diopters (using standard index of refraction of 1.530 for conversion). The back surface 4 together with the front surface 3 is adapted to fulfill the ophthalmic prescription of the user. In the given example, the shape of the lens is non-circular adapted to a 50×40 mm elliptical frame. However, the lens shape may be adapted to other frame geometries or perimeters. Surrounding the contour plot is a display of the thickness of the lens edge 2 giving numerical values in millimeters at various points. In the given example, the edge thickness is adjusted to correspond to approximately 1 mm. The surfaces 3, 4 are adapted to provide a light weight but sufficiently stable lens. The right side of FIG. 1 shows a vertical cross section of this lens 1.

For structural and other practical considerations, the minimum edge thickness of the lens is constrained to be greater than or equal to some minimum predetermined thickness such as for example 1 mm. Under this condition, the center thickness of the lens is 2.60 mm. Optionally, prism thinning may be applied. A (vertical) tilt of one of the surfaces can be adjusted to give a minimum center thickness. Given the optical constraints regarding the prescription of the user and including the size and shape of the frame as well as the minimum edge thickness, FIG. 1 shows the thinnest possible lens 1.

To fully appreciate the present disclosure, it is necessary to understand the lens manufacturing including the lens blocking system. As shown in FIG. 2, blocking refers to the process of attaching the (semi-finished) lens blank 5 to a block piece 11 for mounting in a machine chuck for the cutting and polishing processes. The machine chuck clamps onto the blocking piece 11, and the blocking piece 11 is attached to the lens blank 5 (from which the lens 1 is formed by machining the back surface) using a holding medium such as, for example, a low melting temperature alloy. The diameter of alloy support can be chosen from a range of fixed values, to be as big as possible while still smaller than the final diameter of the lens. This gives maximum support to the lens during processing, while avoiding cutting into the supporting alloy block. The physical diameter of the alloy block is set by a blocking ring which acts as a mold for the molten alloy during the joining of the blocking piece to the lens. Once set, the alloy is released from this ring, leaving the lens securely attached to the blocking piece ready for processing.

During the surfacing process, the lens diameter can be cribbed (reduced) to a size typically smaller than the original lens blank but larger than the size required to fit the lens into the frame. This diameter can be further reduced when glazing or edging to the frame, but intermediate steps may apply coatings to improve the lens scratch resistance and anti-reflective properties. It is beneficial for the lens crib shape to be larger than the frame shape during these intermediate processes so that any coating defects around the edge such as coating clip marks, resin rollback, etc. are removed during the edging process when glazing to the frame.

The choice of cribbing diameter of ophthalmic lenses in the plus prescription range can be particularly challenging. It is to be understood that plus prescription lenses 1 by their physical form typically have a concave back surface 4 having flatter curvature than the convex front surface 3 and their center thickness is limited by the thickness of the lens edge 2. Consequently, for a given plus prescription, the larger the lens diameter, the larger the center thickness of these lenses. This leads to a conflict between three desirable features of a lens produced on a freeform generator: (i) the desire to deliver the thinnest/lightest lens possible to the wearer; and (ii) the convenience and efficiency of generating lenses using a standard diameter round cribbing shape, and (iii) to include a large radial buffer around the frame shape to ensure the lens can be edged to the frame free of coating defects.

Producing such a lens typically starts with the selection of a standard round puck having the desired convex (spherical) front surface. The back surface of the puck is machined on a freeform generator, as indicated by the cutting arc 13 in FIG. 2, (and subsequently polished) to produce the desired back surface. For example, an 80 mm diameter puck might be available for the process. Machining the optical surface corresponding to FIG. 1 onto the back of such a puck, while maintaining a 1 mm minimum edge thickness at the full diameter, would produce a significantly thicker lens, as shown in FIG. 3. Hence, repeating the lens design of FIG. 1 for such an 80 mm puck would result in a required center thickness of 8.31 mm (as shown in FIG. 3) instead of 2.60 mm (as shown in FIG. 1). Hence, edging the final elliptical lens from this larger version would deliver an unacceptable thick and heavy lens to the wearer when mounted in the frame.

Hence, to enable these lenses to be made as thin as possible, in conventional manufacturing the crib shape may be determined as small as possible while still enabling the frame to be cut out. Using conventional processing with hard lap polishing it is possible for the edge thickness of the cribbed lens to become very thin (for instance less than 0.3 mm), in order to minimize the lens thickness in the frame.

FIG. 4 exemplarily illustrates the size of the frame 20 with respect to the lens shape 10 before edging. The dashed line 21 illustrates a buffer that may optionally be added onto the frame size during processing to avoid the afore-mentioned coating defects within the actual frame 20. In the given example, the inner frame may be a 45 mm×35 mm oval shape. The outer crib shape 10 may be a 70 mm diameter circle.

FIG. 5A illustrates the problem that reducing the lens thickness while maintaining the same front and back surfaces similar to FIG. 3 will eventually lead to a zero lens thickness at the points indicated by reference numeral 31 and even a theoretically negative lens thickness at the edge 2, i.e., in practice leading to a lens diameter smaller than the standardized lens blank diameter. The actually needed prescription zone is indicated by reference numeral 32.

FIG. 5B shows a diagram of the surface mean power (left) and cylinder (right) corresponding to the lens of FIG. 5A. The lens has both sphere and cylinder power and a progressive addition. In the given example, the lens 1 is a back surface progressive lens having prescription+4/−1 @ 45, 2.25 add, i.e., a plus 4 D (diopters) sphere lens having a minus 1 D cylinder at 45° and a plus 2.25 D add power progressive lens portion.

It should be borne in mind that freeform processes typically use soft polishing pads for which a minimum edge thickness may be required because a very thin edge may damage and spoil the polishing process. Hence, a minimum edge thickness has to be ensured. It should be noted that freeform calculations may have the possibility to apply non-circular crib shapes, either with symmetry (e.g., ellipse) or a non-symmetrical complex shape to try to remove any sections of the crib shape below a predetermined thickness threshold while still allowing sufficient radial allowance from the frame for the coating and glazing process considerations as indicated by line 21 in FIG. 4.

However, for the purpose of automated lens manufacture it would be preferable to produce all lenses to a circular shape with identical diameter regardless of prescription. This diameter might be equal to the largest diameter needing to be produced for any prescription. An advantage is enabling simplified automated systems e.g., for robotic handling of lenses. As a further advantage it may allow the use of a single lens blocking ring specification, having a large diameter to give maximum lens support during surfacing processing. However, with conventional systems, as illustrated in FIG. 3 above, providing all lenses with the largest diameter would provide plus prescription lenses that are unnecessary thick.

As a further disadvantage of related art manufacturing with the existing freeform surfacing process, a decision must be made regarding the blocking ring to be used on a case-by-case basis, e.g., based on a calculated crib diameter for the user-specific lens to choose a blocking ring that is as large as possible to give full lens support, but that is smaller than the crib size. Hence, a range of blocking rings must be provided leading to increased cost and more complex manufacturing. It would thus be advantageous to reduce the number of blocking rings to be chosen from. This would also minimize or remove the need to select and change the blocking ring, therefore facilitating the speed and ease of automation of the blocking process.

Referring again to FIG. 3, in the given example, the full area of the 80 mm diameter lens 1 is optically correct. However, since only the central zone, here e.g., a central 50 mm×40 mm elliptical shape, corresponds to the spectacle frame selected by the user there are no optical constraints on the back surface exterior to that region. Hence, this region can be considered to be a non-prescription zone surrounding the prescription zone. It is thus suggested to further reduce a thickness of the lens provided in FIG. 3 such that the back surface inside the prescription zone given by the frame shape 20 may correspond to the back surface of FIG. 1.

FIG. 6 shows a modified example of the lens 1 shown in FIG. 5A, wherein the thickness of the lens 1 in the zone 32 corresponding to the (smoothed) frame shape 20 is identical (to within a few hundredths of a millimeter) and the peripheral portion is extended to meet a minimum edge thickness requirement. In other words, starting from the smoothed frame shape 20 or typically the smoothed frame shape and buffer 21, the back surface is blended towards the edge 2 of the lens shape 10 of the uncut finished lens.

The cross sections in FIGS. 5A and 6 illustrate the horizontal and vertical meridians with and without blending outside of the frame shape. Without the blending, as illustrated in FIG. 5A, the theoretical shape has the back surface intercepting the front surface before the outer diameter of the lens blank is reached. The lenses illustrated in FIGS. 5A and 6 are identical inside the frame shape 20 in the prescription zone 32, so once edged or glazed to the frame, this aspect of the manufacturing method may no longer be visible to the user.

Figure 7:
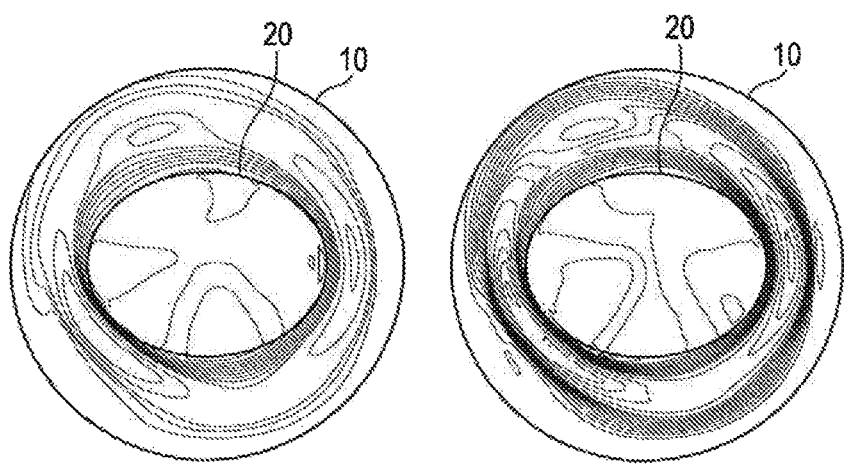
FIG. 7 shows a diagram of the surface mean power and cylinder corresponding thereto.

FIGS. 5B and 7 show diagrams of the back surface curvature in terms of the mean surface power (left Figure) and surface cylinder power (right Figure) for the lenses corresponding to FIGS. 5A and 6. A problem with blending or changing the shape of the back surface curvature outside the frame zone 20 is that the curvature may have to be changed to ensure that the back surface can become steep enough to ensure the lens front and back surfaces do not intersect (cf. FIG. 5A) before the full diameter is reached. Otherwise, the lens thickness would have to be increased to achieve the full diameter and this would compromise the cosmetics and weight of the lens in the frame. The contour plot of FIG. 7 clearly shows a strong increase in the surface curvature surrounding the prescription zone 20. Hence, this curvature may provide a limitation on the maximum diameter or curvature radius of a tool for machining the back surface such that a small diameter manufacturing tool may be required. However, the inventors recognized that the use of a small manufacturing tool may result in longer processing times and thus increased manufacturing cost.

Furthermore, the inventors have recognized that a resulting shape such as the one shown in FIG. 7 may be non-rotational symmetric. Hence, considering lens machining by a turning process (i.e., similar to a lathe) this may lead to height variations along a (typically circular) cutting path followed during the turning process. The cutting machines may be designed to follow the requested surface as closely as possible to maintain design integrity over the full lens diameter. However, to follow rapid variations in sagittal curvature, a rotational speed of the machine may thus have to be reduced. Therefore, the machining process time may be compromised, and if the surface is difficult enough, the turning speed required to ensure design integrity may become so slow that it may cause accelerated wear on the cutting tool, because the tool may start to drag rather that cut. Taken to the extreme, if the surface is too difficult, the design integrity cannot be maintained with the machine speed lower limit, and the machine cannot calculate a cutting process.

It should further be noted that during the turning process, the lens may be rotated at a nominated rotational speed. However, the relevant parameter to the design integrity can be considered to be the linear speed at the contact point with the tool. Hence, for constant revolutions per minute (RPM), the linear speed at the contact point will be larger at the outer diameter of the lens than at the center of the lens, as described by the relationship v=r×ω, where v=the linear speed of the tool tip against the lens surface; r is a radius of the tool contact point form the center of rotation of the lens blank; and ω is the rotational speed of the lens.

Hence, in case a surface curvature of the lens varies with rotational position, as given in the example of FIG. 7, the cutting machine may have to use a slower rotational speed at the outer diameter of the lens in order that it can maintain design integrity according to the limits of the ability of the cutting motor to follow the surface shape in terms of height variation. As the cutting path approaches the center of the lens, the rotational speed may be increased. However, in case of a surface as shown in FIG. 7, the modified surface has greater complexity for curvature variation at the outer region, which places increased difficulty for the manufacturing process to maintain design integrity. As a result, the manufacture of a surface as shown in FIG. 7 may lead to particularly slow process times compared to lenses without such an extension or blending.

Figure 8:
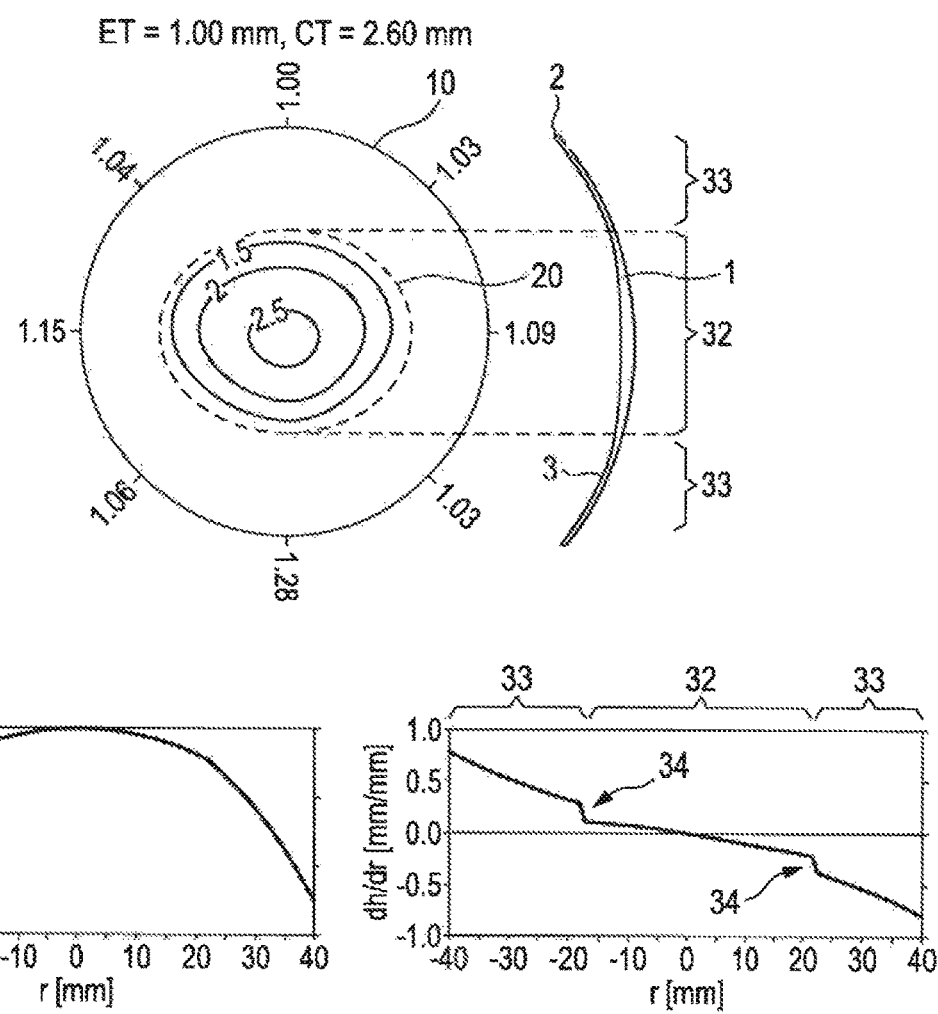
FIG. 8 shows diagrams of a theoretical thin lens: a thickness contour plot, a cross sectional view, a back surface height graph, and a back surface slope graph.

One exemplary shape for a non-prescription zone 33 surrounding the central prescription zone 32 is illustrated in the top graph of FIG. 8, wherein the edge thickness of FIG. 1 may be extended radially towards the edge 2 of the lens shape 10. The lower left graph in FIG. 8 shows the surface height of the back surface 3 along the 90° meridian (vertical cut in the top graph in FIG. 8). The bottom right graph illustrates the corresponding back surface slope. Outside of the prescription zone 32, in a peripheral region 33, the theoretical lens provides a predetermined thickness of e.g., 1 mm towards the edge 2. However, as shown in the bottom right graph of FIG. 8, this theoretical design leads to a slope discontinuity 34 between the prescription zone 32 and the peripheral region 33.

It is not possible to cut such a surface in a single continuous pass for two reasons. Firstly, it would require an infinitely small "zero radius" cutting tool tip. Secondly, it would require infinite acceleration in the depth direction. The second aspect is due to the manufacturing by a turning process and the non-circular symmetric shape. In other words, the cutting tip would need to "jump" in height when following the circular pass of the turning process.

Figure 9:
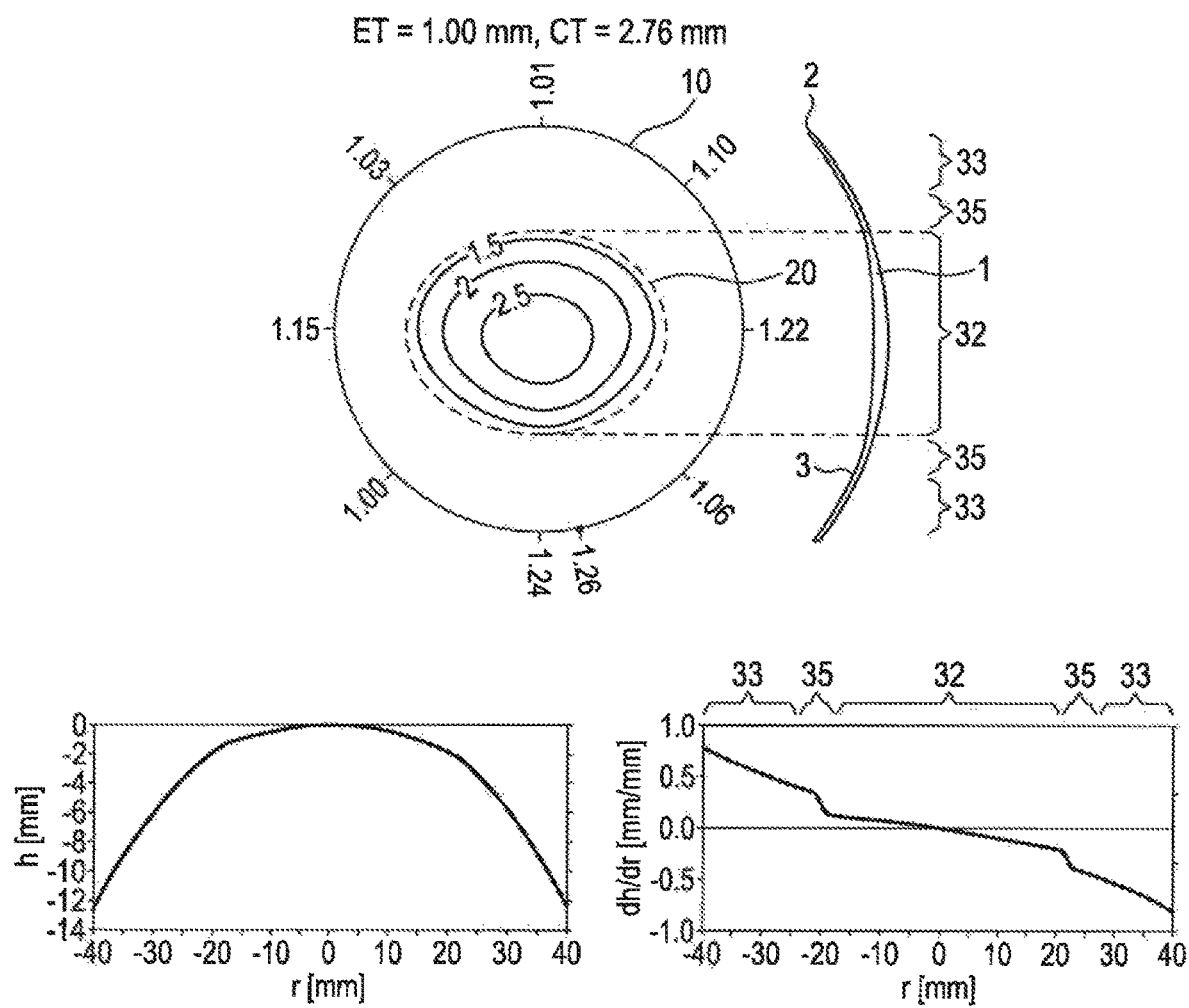
FIG. 9 shows a modified example of the diagrams of FIG. 8 taking into account a minimum (manufacturable) curvature of a cutting tool.

FIG. 9 shows a modified version of the spectacle lens 1 provided in FIG. 8, wherein the discontinuity 34 is modified to provide a continuous transition or blending zone 35 between the prescription zone 32 and the peripheral region 33. This requires that the back surface 3 may have at least C1 continuity, i.e., is a continuous surface further having a continuous first derivative, and contains no location having a curvature below that of the smallest practical cutting tip of the cutting tool.

A drawback of the exemplary embodiment shown in FIG. 9 is that, in view of the boundary condition of maintaining a minimum lens thickness (here 1 mm) and the limited maximum curvature to be cut with the cutting tool, the central thickness of the lens slightly increases to 2.76 mm in FIG. 9 compared to the ideal case of 2.60 mm as illustrated in FIGS. 1 and 8. The higher the maximum machinable cutting tool curvature (small cutting radius) the more closely the back surface shape can resemble the shape provided in FIG. 8. Hence, the smaller the cutting tool, the thinner the lens.

Figure 10:
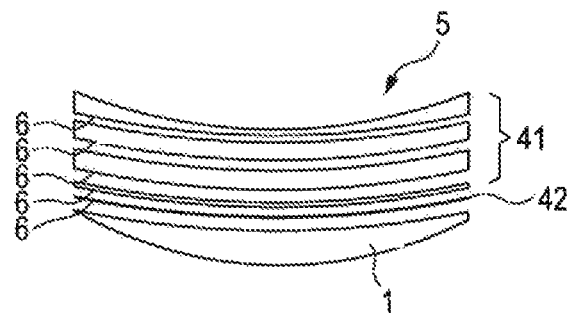
FIG. 10 shows a diagram illustrating cutting steps based on a predetermined lens shape.

In the related art lens manufacturing process, a single cutting file or single cutting surface 6, i.e., a single numerical description of the back surface, is determined and the back surface machined based on this cutting file. However, a cutting depth may scale with cutting tool radius. Hence, a cutting tool having a small radius and thus capable of machining a surface with high surface curvatures as required by FIG. 9, may only have a limited cutting depth. Hence, several cutting passes may be required to achieve a desired final shape of the lens 1, as indicated in FIG. 10. In the exemplary embodiment shown in FIG. 10, five separate passes are required to reduce the thickness of the lens blank 5 to the finished lens 1.

For example, an 8 mm diameter polycrystalline diamond cutting plate (PCD plate) may be used as the cutting tool. Optionally, the number and depth of PCD cuts 41 may be adjusted so as to leave a remaining surface height to enable fine processing using a finishing tool in a final pass 42, such as e.g., a 2 mm radius monocrystalline diamond (MCD), to provide the final lens 1 having the correct surface shape with a high surface quality. In the given exemplary embodiment, the processing time for manufacturing the lens 1 is 5.90 minutes.

Figure 11:
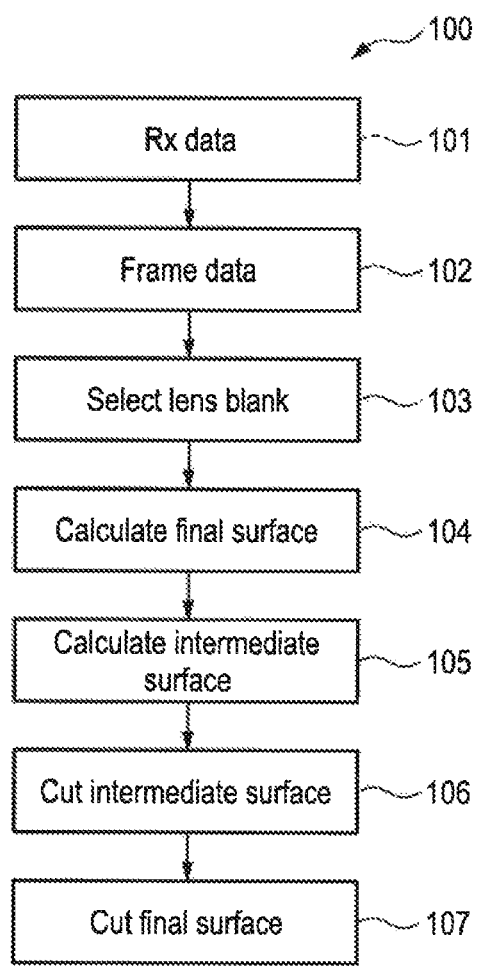
FIG. 11 shows a schematic flow chart of an exemplary embodiment of a method for designing and manufacturing a spectacle lens.

FIG. 11 shows a flow chart of a manufacturing method 100 for manufacturing a spectacle lens 1. In a first step 101, prescription data descriptive of an ophthalmic prescription of a user is obtained. In the given non-limiting exemplary embodiment, the prescription data can be descriptive of an ophthalmic prescription in the plus prescription range. For example, the prescription data may comprise a spherical power, and optionally an addition power, cylinder, and/or prescription prism.

In a second step 102, frame data descriptive of a perimeter of a spectacle frame chosen by the user (in which the lens is to be mounted) is obtained. For example, the frame data can describe an outline of the frame, optionally including a radial buffer for manufacturing.

In step 103, a lens blank having a convex front surface and a back surface is provided.

In step 104 a final cutting surface to be machined on the back surface of the lens blank in the secondary cutting phase is determined. In step 105 an intermediate cutting surface to be machined on the back surface of the lens blank in a primary cutting phase is determined; wherein the final cutting surface comprises (i) a prescription zone, in which the final cutting surface together with the front surface fulfills the ophthalmic prescription of the user; and wherein a boundary perimeter of the prescription zone encloses the perimeter of the spectacle frame; and (ii) a non-prescription blending zone surrounding the prescription zone, in which the final cutting surface together with the front surface provides at least a predetermined minimum thickness of the spectacle lens. The intermediate cutting surface is determined based on the final cutting surface; wherein a maximum curvature of the intermediate cutting surface is smaller than a maximum curvature of the final cutting surface; and wherein a lens thickness provided by the intermediate cutting surface exceeds a lens thickness provided by the final cutting surface at least within the prescription zone.

Next, in step 106 the intermediate cutting surface is machined on the back surface of the lens blank in the primary cutting phase. In step 107 the final cutting surface is machined on the back surface of the lens blank in the secondary cutting phase.

It is to be understood that some of the processing steps may also be carried out in parallel or in a different order. For example, steps 101, 102 and 103 can be performed in a different sequence or even in parallel. As a matter of fact, the lens blank only has to be provided before the actual machining steps 106 and 107 start. However, since the intermediate cutting surface depends on the final cutting surface, the step 105 has to be performed after step 104 at least after determining the prescription zone of the final cutting surface. Moreover, the intermediate cutting surface has to be machined in step 106 before the final cutting surface in step 107. An advantage of the solution described herein is that since the maximum curvature of the intermediate cutting surface is smaller (i.e., a cutting tool having a larger radius can be used) than a maximum curvature of the final cutting surface (i.e., a cutting tool having a smaller radius has to be used) the requirements as to the manufacturing of the intermediate cutting surface can be relaxed. Hence, for example a cutting tool having a larger radius can be used so that a greater thickness can be removed in a single pass.

Figure 12:
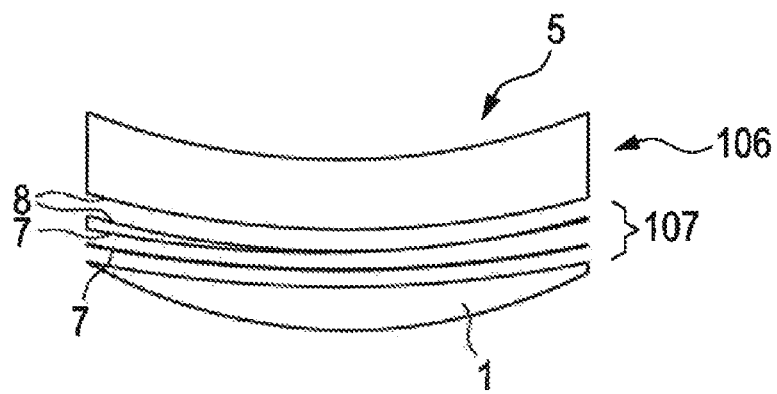
FIG. 12 shows a diagram illustrating cutting steps using an intermediate surface.

FIG. 12 exemplarily illustrates such a two-stage process. In step 106, the primary stage may use a simple surface, sufficiently smooth for a larger-diameter milling tool to quickly reduce a height of the semi-finished lens blank 5 to provide a thinner blank with back surface 8 having a shape corresponding to the intermediate surface. In the subsequent step 107, the final cutting surface 7 is machined onto the back surface of this reduced lens blank, where the final surface is designed to provide the correct optics inside the prescription zone and to minimize the final center thickness.

As shown in FIG. 12, the intermediate cutting surface 8 leaves a sufficient height or material thickness in the prescription zone to allow proper processing of the final surface. Machining of the final surface 7 may require one or multiple passes, depending on the surface height differences between the intermediate and final surfaces, and the depth of cut of the finishing tool. Optionally, the finishing step may use two different tools, where the first has a larger depth of cut to remove the gross differences in shape between the intermediate and final surfaces, leaving a second pass at constant cutting thickness with a smaller depth of cut by a finer tool to give a high surface quality to deliver the final surface shape at the desired final thickness. In the given example the process time for this amended manufacturing method is 2.63 minutes which constitutes a reduction by 55% of the manufacturing method described with reference to FIG. 10.

In other words, it is proposed to present two different cutting surfaces to the cutting machine. The intermediate cutting surface is an intermediary between the initial semi-finished puck and the final surface shape, having a shape of reduced complexity, for example, having a curvature low enough to be cut using a fast milling tool. This step may remove most of the unwanted material typically leaving the remaining lens thin enough that one or more passes with a finer cutting tool can bring it to the final surface shape 7 at the desired finished lens thickness.

Optionally, to ensure that the thickness remaining to be removed in the secondary step can be removed in a single pass, a prism may be incorporated in the intermediate cutting surface 8 to tilt the surface to be cut. Optionally, an associated compensation to such a blocked prism may be applied to ensure correct optical prism in the resultant spectacle lens.

Regarding the shape of the intermediate cutting surface 8 there are various options to fulfill these boundary conditions wherein the intermediate cutting surface may be sufficiently smooth to be cut quickly with a large diameter milling tool. However, it would further be advantageous to provide an intermediate cutting surface that is also easy to determine or calculate. For example, the intermediate cutting surface may be one of a toric surface, an aspheric surface or a smoothed version of the final cutting surface.

The following, several terms and definitions are provided: Lens blank or puck may refer to the usually round piece of raw material from which the lens will be generated. A milling tool may refer to a cutting tool with large radius for rapid removal of material. A PCD tool may refer to a polycrystalline diamond tool for getting surface close to final shape. A MCD tool may refer to a monocrystalline diamond tool with small radius used for a final cutting pass before polishing. The term first pass may refer to one or more, typically all, cuts using a milling tool. The term first pass surface may be used as an alternative to intermediate surface. Based thereon the primary cutting paths for the first pass can be calculated. The term intermediate lens or intermediate puck may refer to the lens blank after the first pass. The term second pass may refer to one or more, typically all, cuts using PCD and MCD. The term second pass surface may be used as an alternative to final surface based thereon the secondary cutting paths can be calculated. The term final or finished lens or final puck may refer to the lens after the second pass.

In the following reference may be made to $R_{mill}$ for a radius of a coarse/milling tool; $C_{mill}$ for a curvature of the milling tool, and can be defined by $C_{mill}=0.530/R_{mill}$ based on a standard index of refraction of 1.530; $R_{PCD}$ for a radius of a fine/PCD tool, $C_{PCD}$ for a curvature of the fine/PCD tool; $R_{FP}$ for a minimum radius of the intermediate or first pass surface; $C_{FP}$ for max curvature of the intermediate or first pass surface; $R_{SP}$ for a radius of the final or second pass surface, in particular in a non-prescription blending zone extending radially outward from the prescription zone; $C_{SP}$ for the corresponding curvature; S for a slope of a (linear extension) of second pass surface; $ET_{Pmin}$ for a minimum edge thickness of the lens over its entire diameter; $ET_{PMIN}$ for minimum allowed edge thickness of the lens over its entire diameter; $ET_{Lmin}$=minimum edge thickness of lens within the portion corresponding to the spectacle frame after edging; $ET_{LMIN}$ for a minimum allowed edge thickness therein; $CT_{FD}$ for a center thickness of intermediate lens after first pass; $CT_{SP}$ for a center thickness of final lens after second pass; $T_{min}$ for a minimum thickness anywhere on the final lens; $T_{MIN}$=minimum allowed thickness anywhere on the final lens; $DT_{min}$ for a minimum difference in thickness over the frame area between first and second passes; $DT_{MIN}$ for a minimum allowed difference in thickness over the frame area between first and second passes; $DT_{max}$ for a maximum difference in thickness over the frame area between passes; $DT_{MAX}$ for a maximum desired difference in thickness over the frame area between passes; $R_{min}$ for a start radius of linear increase in curvature; $R_{max}$ for an end radius of linear increase in curvature; $C_a$ for a curvature at lens center (R=0) along lower curvature principal meridian of intermediate surface; $C_b$ for a curvature at lens center (R=0) along higher curvature principal meridian of intermediate surface; $\Delta C$ for a change in curvature between $R_{min}$ and $R_{max}$; and $\Delta C_{max}$ for a maximum allowed value of $\Delta C$.

In the following, an exemplary embodiment of designing an aspheric surface to be used as the intermediate surface is provided.

In this exemplary embodiment, as a starting point, a central curvature of the intermediate cutting surface can be set equal to the curvature of the final cutting surface at a predetermined point on the surface, for example the fitting point. In the given example this is 6.08 D/1.10 D at @ 90, i.e., a curvature of 6.08 D with a cylinder of 1.10 D at 90°, thus the curvatures along the two independent meridians $C_a$ and $C_b$ can be expressed as 4.98 and 6.08 D (based on an index of reflection of 1.530) respectively.

Figure 13:
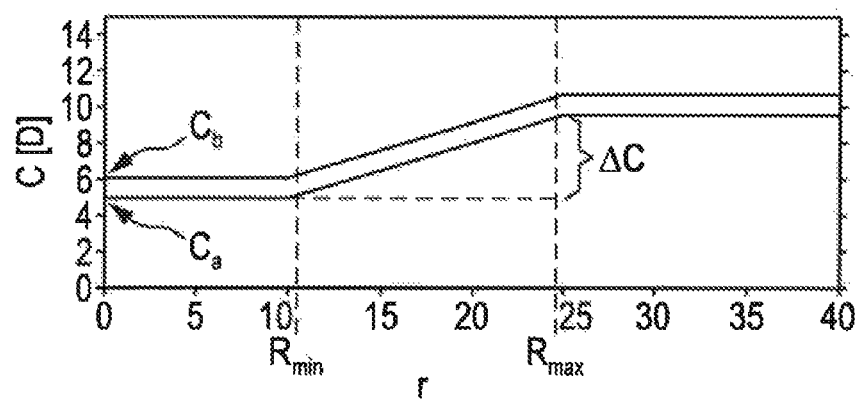
FIG. 13 shows a diagram of curvature profiles for an intermediate surface.

Optionally, the curvature along each of these primary meridians may increase towards the edge of the lens blank. FIG. 13 shows exemplary curvature profiles for the independent meridians. The horizontal axis denotes the radial distance r and the vertical axis denotes the curvature C in diopters. In the given example the curvatures $C_a$ and $C_b$ start at the values corresponding to the final cutting surface, are followed by a linear increase between predetermined starting and ending radii with a linear curvature increase, and with a total increase in curvature $\Delta C$.

While the central curvatures $C_a$ and $C_b$ are generally different for the two meridians, the parameters associated with the linear increase in curvature $R_{min}$, $R_{max}$, and $\Delta C$ can be the same for both profiles. Given these parameters, the corresponding one-dimensional heights of the intermediate cutting surface are $Z_a(r)$ and $Z_b(r)$ along the two meridians, where r is the radius. The conversion between curvature and surface heights is known and for example described in U.S. Pat. No. 4,861,153. One suggested option for the final form of the intermediate surface is:

$$Z(r,\theta)=Z_a(r)\sin^2(\theta-\theta_0)+Z_b(r)\cos^2(\theta-\theta_0),$$

where $\theta$ is the meridian angle and $\theta_0$ is the cylinder axis.

An advantage of this exemplary embodiment is that an intermediate cutting surface is provided that can easily be calculated and manufactured. Hence, the full set of adjustable parameters for the intermediate cutting surface to be machined during the primary cutting phase can be defined by $R_{min}$, $R_{max}$, $\Delta C$, and the center thickness of the partially processed lens blank, i.e., the center thickness after machining the intermediate cutting surface $CT_{FP}$.

According to an aspect of the solution proposed herein, the final cutting surface to be machined in the secondary cutting phase and the intermediate cutting surface to be machined in the primary cutting phase may thus have different parameters and different constraints. In particular, the final cutting surface may be adapted to provide optimum optics for the finished lens whereas the intermediate cutting surface may be adapted for fast and easy machining. It will be understood that since the intermediate cutting surface depends on the final cutting surface, details of an exemplary embodiment of a final cutting surface will be described first.

The final cutting surface may be adapted to fulfill one or more of the following conditions. A maximum curvature (minimum curvature radius) anywhere on the surface $C_{SP}$ may be less than a maximum curvature that can be manufactured by the cutting tool used for machining the final cutting surface, for example a PCD tool able to manufacture a curvature $C_{PCD}$. A minimum lens thickness anywhere on the spectacle lens $T_{min}$ may be greater than some specified minimum $T_{MIN}$ (generally less than the minimum edge thickness). A minimum thickness at an edge of the final spectacle lens $ET_{LMIN}$ may be greater or equal to the specified minimum edge thickness $ET_{LMIN}$. It is to be understood that this condition may not be applied over the entire diameter in cases where the final cutting surface intersects with the intermediate cutting surface such that the final cutting surface may be truncated before reaching an edge of the lens blank.

In an exemplary embodiment, the method for constructing the final cutting surface may comprise at least some of the following steps: (i) Define a final back surface which together with the front surface fulfills the ophthalmic prescription of the user. (ii) Define a boundary perimeter enclosing the perimeter of the spectacle frame on this optical surface. The boundary perimeter can be the frame itself, the frame with a safety buffer, or may be a simpler shape such as a circle or ellipse enclosing the frame shape. The boundary perimeter can be a smoothed version of the spectacle frame. (iii) Extend the prescription surface past the boundary perimeter towards the edge of the uncut lens shape as a smooth surface to achieve at least a minimum target thickness while maintaining the curvature to be less than some maximum defined by the manufacturing process. This may or may not be possible depending on the desired outer diameter, thickness, and maximum allowed curvature. One approach is to initially construct a series of independent radial extensions in discrete radial sections and then fit a smooth surface to those. Each radial section should satisfy the required conditions for the final surface. A way to achieve this is to construct a circular arc tangent to the prescription surface in that section at the boundary of the prescription zone, choosing the radius of the arc such that the arc becomes parallel with the front surface in the outer section with at least the required minimum thickness. If this point is reached inside the desired outer diameter a second circular arc may be constructed to continue the sectional extension beyond that point. Depending on the aim, the second arc may be parallel to the front to maintain the minimum required thickness to the full diameter, or it may be steeper so that the lens thickness increases towards the edge. In a next step (iv) the intermediate cutting surface may be determined for example as described above. Subsequently, in step (v) it may be determined where the final cutting surface and the intermediate cutting surface intersect outside the prescription zone along an intersection curve. Optionally, the final cutting surface may be truncated to the regions that have the entire final cutting surface at equal or lower thickness than the intermediate cutting surface. In this way, any portions of the final cutting surface where a tool would be air cutting anyway may be deleted to increase the manufacturing efficiency.

In an exemplary embodiment, a method for constructing the final cutting surface may comprise the following steps: (i) Define a final back surface which together with the front surface fulfills the ophthalmic prescription of the user. (ii) Define a boundary perimeter enclosing the perimeter of the spectacle frame on this optical surface. The boundary perimeter can be the frame itself, the frame with a safety buffer, or may be a simpler shape such as a circle or ellipse enclosing the frame shape. The boundary perimeter can be a smoothed version of the spectacle frame. (iii) Extend the surface past the boundary perimeter towards an edge of the uncut lens shape, e.g., along every radius with C1 continuous circular arcs typically having a specified constant curvature $C_{SP} < C_{PCD}$. (iv) Extend this non-prescription (blending) zone surrounding the prescription zone along every radius with linear C1 sections at the point where the slope reaches some specified value S. At this point a final center thickness of the framed lens may be determined at least within the prescription zone. In a next step (v) the intermediate cutting surface may be determined for example as described above. Subsequently, in step (vi) it may be determined where the final cutting surface and the intermediate cutting surface intersect outside the prescription zone along an intersection curve. Optionally, the final cutting surface may be truncated to the regions that have the entire final cutting surface at equal or lower thickness than the intermediate cutting surface. In this way, any portions of the final cutting surface where a tool would be air cutting anyway may be deleted to increase the manufacturing efficiency.

The intermediate cutting surface may be adapted to fulfill one or more of the following conditions. For the intermediate cutting surface one constraint may be that a minimum difference between the final cutting surface, i.e., a final thickness of the spectacle lens at least within the prescription zone, and the intermediate cutting surface $DT_{min}$ may be at least $DT_{MIN}$. Thereby a sufficient thickness for completing the secondary cutting phase with high surface quality is provided. A maximum curvature anywhere on the intermediate cutting surface must be below that of the manufacturing tool for machining the intermediate cutting surface, for example below the maximum curvature to be manufactured by a milling cutting tip $C_{mill}$. In case of using a curvature profile as illustrated in FIG. 13, this can result in that a change in curvature $\Delta C$ may be such that the maximum curvature anywhere on the surface $C_{FP} = C_b + \Delta C$ must be below that of the milling cutting tip $C_{mill}$. As a further constraint, a minimum edge thickness of the lens blank after the primary cutting phase (after machining the intermediate cutting surface on the back surface of the lens blank) $ET_{Pmin}$ may be at least the allowed minimum $ET_{PMIN}$. Moreover, it would be desirable to keep the maximum difference between the intermediate and final cutting surfaces $DT_{max}$ below a predetermined threshold $DT_{MAX}$ so that only one pass for machining the final cutting surface may be sufficient. It should be noticed that even with these constraints there may be several solutions for designing the intermediate cutting surface.

One option to remove this ambiguity is to select a set of constraints satisfying parameters that reduces or minimizes a curvature gradient. For example referring again to the curvature profile shown in FIG. 13, minimizing $\Delta C / (R_{max} - R_{min})$. Then, selecting the further parameters may be accomplished with the following procedure as illustrated in the flow chart of FIG. 14, where $CT_{FP}$ may be the center thickness of the intermediate cutting surface.

Figure 14:
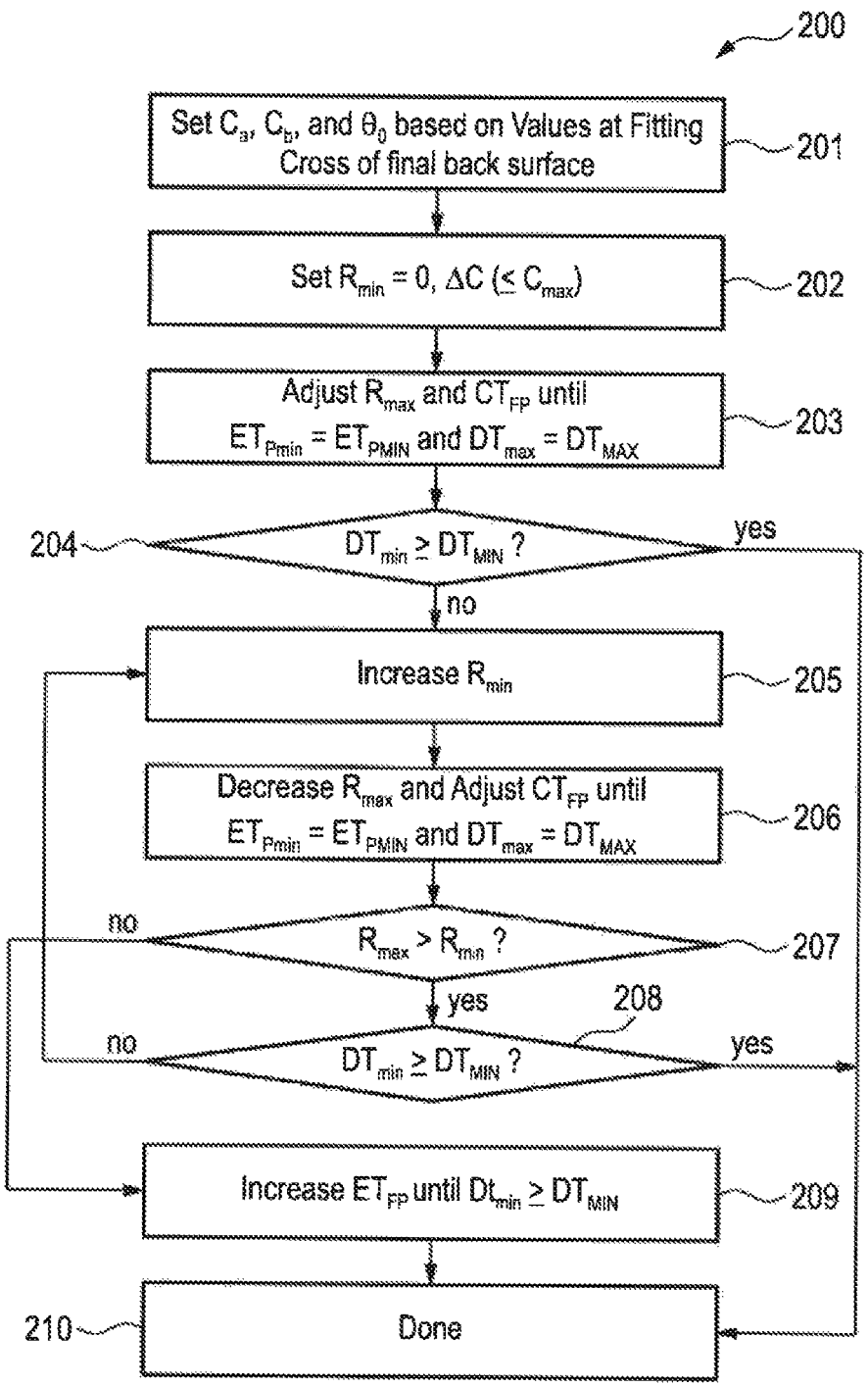
FIG. 14 shows a flow chart for determining an intermediate surface.

FIG. 14 shows an exemplary flow chart 200 of designing the intermediate cutting surface.

In a first step 201, the parameters $C_a$, $C_b$ may be set e.g., based on the curvature values at a fitting point of the final cutting surface within the prescription zone. In the next step 202, $R_{min} = 0$ may be set as a starting condition and $\Delta C$ $\Delta C_{max}$ may be set to a typically large value for which $C_b + \Delta C < C_{mill}$ is fulfilled. In a next step 203 $R_{max}$ may be adjusted (which may exceed the radius of the lens blank) and $CT_{FP}$ may be adjusted such that $ET_{Pmin} = ET_{PMIN}$ and $DT_{LMAX} = DT_{LMAX}$. This adjustment may require iteration and end if $DT_{min} \geq DT_{MIN}$ as specified in step 204, such that the procedure may end in step 210. If the condition is not or cannot be fulfilled in step 204, $R_{min}$ can be increased in step 205 and the calculation of $R_{max}$ and $CT_{FP}$ can be repeated in step 206 under the constraints as before, and again end if $DT_{min} \geq D-T_{MIN}$ in step 208. If the condition is not fulfilled $R_{min}$ may be increased further for example until either $DT_{min} \geq DT_{MIN}$ or until $R_{max} = R_{min}$. If $R_{max} = R_{min}$ or $R_{max} > R_{min}$ is determined in step 207, then $CT_{FP}$ may be increased in step 209 until $DT_{Lmin}$ $DT_{LMIN}$ (thereby tolerating $DT_{max} > DT_{MAX}$).

In the following, an exemplary embodiment of a design process for a final lens corresponding to the one already described with reference to FIG. 1, i.e., the same+3/−1 @ 90, 2.50 add back surface progressive lens will be described and explained in more detail with reference to FIGS. 15 to 21.

The first step is determining the final cutting surface to be machined on the back surface of the lens blank in a secondary cutting phase. In the given example, the boundary perimeter may be set to the elliptical frame boundary. However, other boundary perimeters enclosing the frame may be used. Inside that boundary the surface fulfills the ophthalmic prescription of the user. The prescription zone is surrounded radially by a non-prescription blending zone in which the machined surface together with the front surface provides at least a predetermined minimum thickness of the spectacle lens. The non-prescription blending zone may be determined by extending, radially from the boundary perimeter, circular arcs which may match the slope of the prescription zone at the boundary perimeter. For example, the extension arcs may have constant radius of e.g., 10 mm (53 diopters), so that the curvature is less than an 8 mm radius (66.25 diopter curvature) of a cutting tool for machining the final cutting surface. Optionally, each radial extension may be truncated when the slope becomes less than a predetermine slope value, e.g., less than a slope of −1.0 or 45° (measured radially outward). For the constraints it can be assumed that the maximum edge thickness of the lens may be 1.0 mm and a minimum allowed thickness of the spectacle lens may be 0.5 mm. Hence, the relevant parameters can be set as $R_{SP} = 10$, $C_{SP} = 53$; S=−1.0; $ET_{LMIN} = 1.0$; $T_{MIN} = 0.5$.

After the final cutting surface is constructed, a center thickness of the final spectacle lens can be calculated by first setting a minimum lens edge thickness to the minimum allowed $ET_{Lmin} = ET_{LMIN}$, then calculate a minimum thickness anywhere on the finished lens $T_{min}$. If $T_{min} \geq T_{MIN}$, then the corresponding center thickness $CT_{SP}$ is acceptable, otherwise $CT_{SP}$ may be increased until $T_{min} = T_{MIN}$.

Figure 15:
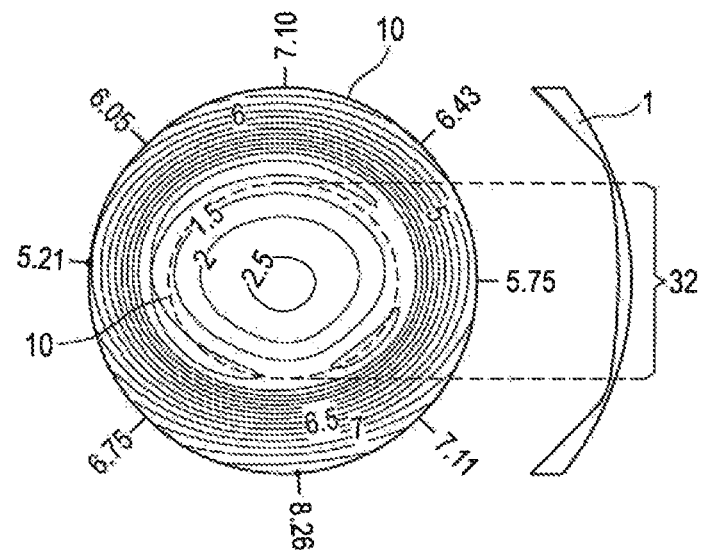
FIG. 15 shows a contour plot regarding the thickness of the spectacle lens.

FIG. 15 illustrates a contour plot regarding the thickness of the spectacle lens calculated based thereon. It should be noted that within the prescription zone, as indicated by region 32, the spectacle lens satisfies all constraints required for the final lens. The center thickness may be identical to the optimal center thickness of the lens as provided in FIG. 1. In the given exemplary embodiment, the minimum thickness anywhere (outside of the prescription zone) in the non-prescription blending zone adjacent thereto is 0.69 mm, thus greater than the minimum allowed 0.5 mm.

However, as explained above, in view of the required curvatures to be manufactured, it would not be possible to machine this shape as shown in FIG. 15 with a single pass of a cutting tool. However, multiple passes would unnecessarily increase the processing time.

Figure 16:
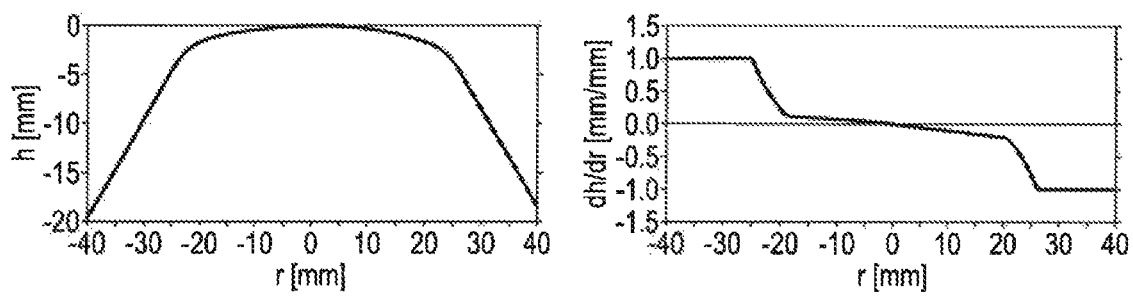
FIG. 16 shows corresponding plots along the horizontal meridian.

FIG. 16 shows corresponding plots along the horizontal meridian of the surface height vs. radius (left Figure) and of the back surface slope (right Figure). As can be seen from the left Figure in FIG. 16, past the highly curved transition zone a constant slope of 45° may be provided.

Figure 17:
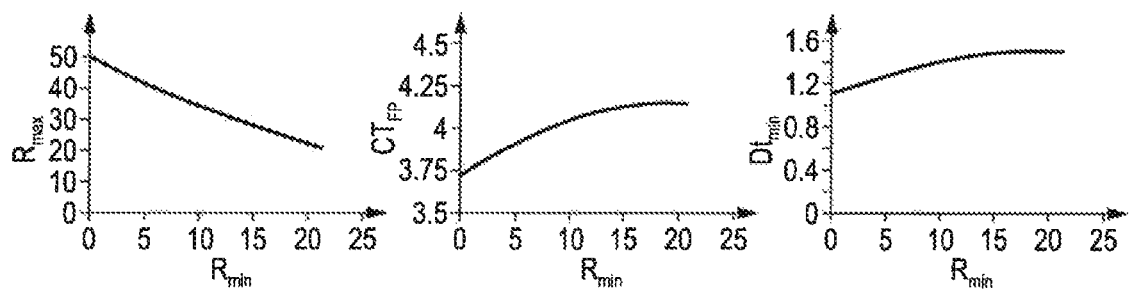
FIG. 17 shows a dependency of the calculation on various parameters.

As a next step, since the final cutting surface has been determined, the intermediate cutting surface can be determined based thereon. The process 200 described with reference to FIG. 13 advantageously reduces or minimizes calculations. To better visualize the calculation, FIG. 17 shows a dependency on the various parameters. In the given example $\Delta C = 7$ diopters. Based on the curvatures of the final cutting surface within the prescription zone of $C_a = 4.98$ D and $C_b = 6.08$ D as in the present exemplary embodiment from the curvatures of the fitting point in the prescription zone this gives a maximum curvature of $C_{FP} = C_b + \Delta C = 13.08$, or $R_{FP} \approx 38.4$ mm. Hence, a cutting tool having a radius $R_{mill}$ of 33 mm may safely be used. The graphs shown in FIG. 17 illustrate the values of $R_{max}$ and $DT_{min}$ as a function of $R_{min}$ that result when $R_{max}$ and $CT_{FP}$ are adjusted to keep an edge thickness of the lens blank $ET_{Pmin} = ET_{PMIN} = 1.0$ mm and $DT_{MAX} = 2.0$ mm. It should be noticed that the curves shown in FIG. 17 abruptly end at $R_{min} = 21.2$ mm. At this point $R_{max} = R_{min}$ so that the curvature gradient may become infinite and the otherwise C2 atoric (continuous) surface becomes C1, resulting in a largest possible value of $DT_{min}$, in this case 1.52 mm. In this example, if the minimum allowed thickness difference between the passes $DT_{MIN}$ may be less than 1.11 mm calculated when $R_{min} = 0$, then the final cutting surface can be constructed by setting $R_{max} = 50.5$ mm from the above curve. If for example $DT_{min} = 1.25$, then from the above curves using $R_{min} = 4.0$ mm, $R_{max} = 43.0$ mm and $CT_{FP} = 3.88$ D would generate the appropriate surface. If $DT_{min} > 1.52$ then, to satisfy the constraint that the continuous (C1) surface could be generated setting $R_{max} = R_{min} = 21.2$ and increasing $CT_{FP}$ by an amount equal to $DT_{min} - 1.52$.

The resulting thickness for the $DT_{MIN} = 1$ shape of the spectacle lens 1 after machining the intermediate cutting surface in a primary cutting phase is shown in FIG. 18 by assuming the following parameters: $C_a = 4.98$; $C_b = 6.08$; $\theta_0 = 90$; $\Delta C = 7.0$; $DT_{MIN} = 1.0$; $DT_{MAX} = 2.0$ and derive parameters $R_{min} = 0$; $R_{max} = 50.5$; $CT_{FP} = 3.73$; $DT_{min} = 1.11$; $DT_{max} = 2.0$.

FIG. 19 illustrates a thickness difference inside the prescription zone as defined by the frame shape 20, hence, the thickness difference between the lens shape shown in FIG. 18 after machining the intermediate cutting surface in the primary cutting phase and the target shape in the central region as illustrated in FIG. 15. FIG. 19 thus illustrates the remaining amount of material that needs to be removed in the secondary cutting phase within the prescription zone. As can be seen from the graph, the difference does not exceed the maximum thickness difference $DT_{MAX}$ that may be removed in a single pass of the cutting tool.

Figure 21:
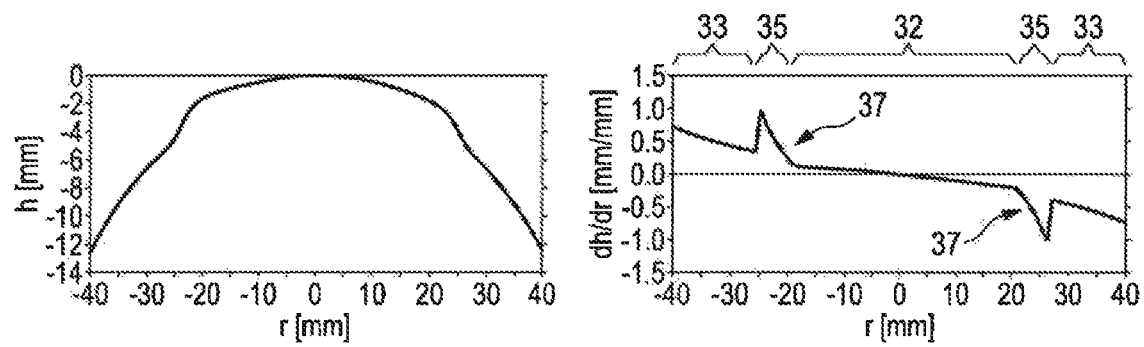
FIG. 21 shows the corresponding back surface height and back surface slope graphs along the vertical meridian of the spectacle lens in FIG. 20.

FIG. 20 illustrates the final thickness of the spectacle lens 1 along the vertical meridian after machining the intermediate cutting surface on the back surface of the lens blank in the primary cutting phase and subsequently machining the final cutting surface on the back surface of the lens blank in the secondary cutting phase. FIG. 21 illustrates the corresponding back surface height and back surface slope graphs along the vertical meridian in the left and right graphs, respectively.

In the diagram shown in FIG. 20, the final lens shape of the spectacle lens 1 in the prescription zone 32 thus corresponds to the final cutting surface, which is surrounded by non-prescription blending zone 35, wherein the lens shape also corresponds to the final cutting surface. However, the non-prescription blending zone 35 is further surrounded by a non-prescription peripheral zone 36 wherein the shape of the final spectacle lens 1 corresponds to the intermediate cutting surface machined in the primary cutting phase. Hence, no lens material is removed in the secondary cutting phase in the portion indicated by reference numeral 47. Hence, since there is no need to remove further material in this section, in particular not using the fine (slow) cutting tool, the manufacturing process can be further accelerated.

Figure 22:
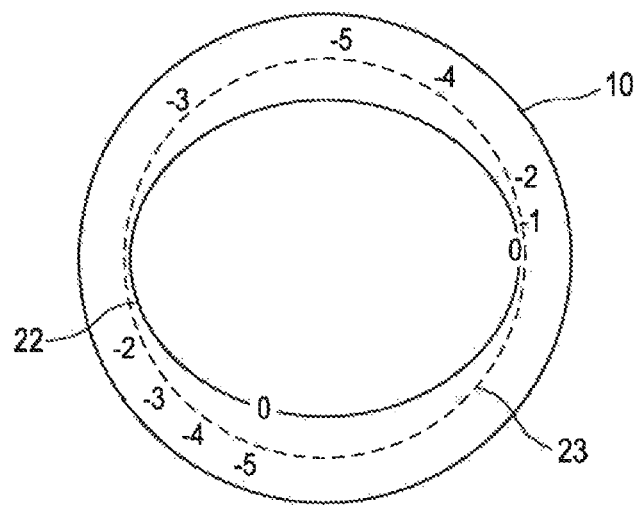
FIG. 22 shows a positioning on a lens blank, where the numerical values indicate the height difference between the intermediate surface and the final surface.

This is also illustrated in FIG. 22, wherein the zero contour 22 marks the boundary inside of which the final cutting surface is removing material in the secondary cutting phase while negative numbers identify the area wherein the secondary cutting phase would be cutting air, i.e., not removing material such that it can be omitted. In the given exemplary embodiment, the full useful region may be arranged inside a circle 23 having a diameter of 66 mm, i.e., significantly less than the full 80 mm diameter of the lens blank. Hence, this circle 23 can be used as the limiting diameter for the secondary cutting phase.

Referring again to FIG. 21, the boundary between the section cut based on the intermediate cutting surface in the primary cutting phase and the final cutting surface machined in the secondary cutting phase is clearly visible by the discontinuity 37 of the back surface slope.

Figure 23:
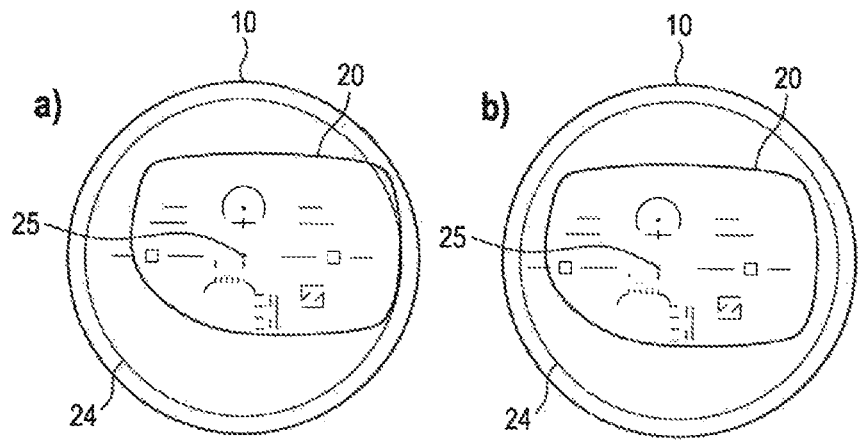
FIG. 23 shows an advantageous positioning of a prescription zone with respect to the lens blank.

To make full benefit of the reduction of the surface to be machined in the secondary cutting phase it is advantageous to center the prescription zone on the lens blank. For comparison, FIG. 23, left graph illustrates the conventional case, wherein an optical design center of the lens 25 is aligned with the geometric center of the lens blank. This would require that almost the entire diameter of the lens blank is machined in the secondary (slow) cutting phase. On the other hand, the right graph in FIG. 23 illustrates the case where the optical design center is intentionally misaligned such that the frame is approximately centered with the geometric center of the lens blank. Thereby, the size to be manufactured in the secondary cutting phase can be reduced and the manufacturing speed can be further increased.

There can be further advantages to positioning the lens prescription zone centrally in the lens blank which also relate to processability. These may include one or more of the following: (i) by maximizing the radial distance between the edge of the prescription zone to the uncut crib edge, it minimizes the likelihood of coating defects that can occur close to the edge of the uncut finished lens from contaminating the prescription zone, for example resin roll back and coating clip marks, (ii) it allows the prescription zone to be fully supported by the diameter of blocking alloy 24, giving maximum stability for cutting and polishing processes, and (iii) it can be difficult for the polishing process to achieve uniform material removal from center to edge of the uncut finished lens, and by minimizing the diameter over which the prescription zone occurs, variations in polishing quality across the prescription zone may be reduced.

A further concern of the present disclosure refers to an advantageous selection of a shape of the boundary perimeter of the prescription zone enclosing the perimeter of the spectacle frame. It has been found that by taking care of the boundary shape from which the blending begins, the manufacturing can be further improved. In particular, it would be advantageous to describe a smooth function with angle, since it has been found that any corners in the origin of the blending region may appear as radial ripples in the blended lens surface. Ideally, it would be advantageous to provide a constant radius (circular) blending boundary centered about a geometric center to give a potentially smoothest shape possible. However, this may not be practical in all cases within the limits of tool curvatures without increasing the lens thickness.

In the following, an approach of determining a perimeter of the prescription zone to provide a blending boundary will be described. As a boundary condition, a maximum allowed radial curvature within the non-prescription blending zone surrounding the prescription zone may be specified to take into account the cutting tools available. Moreover, a maximum acceptable thickness increase for the final spectacle lens within the prescription zone compared to a conventionally manufactured lens (as described with reference to FIG. 1) may be defined. This value may optionally be zero. A boundary perimeter may be calculated based on the following radial functions relative to the geometric center of the lens blank as a function of angle θ:

i) $R_{min}(\theta)$ may be the frame shape or a radially enlarged smooth frame shape such as a smoothed frame shape plus optionally plus buffer radials;

ii) $R_{max}(\theta)$ may be an estimate of a maximum radius at which the blending could take place based upon the thickness and rate of change dT/dR at $R_{min}$, and satisfying the boundary condition of a maximum allowable thickness increase in radial curvature;

iii) $R_{circ}(\theta)$ may be a smallest circular shape which fully encloses the radially enlarged smoothed frame shape. Since this circle may not be centered on the lens geometric center, $R_{circ}$ may not be constant with angle; and iv) $F(\theta)$ may be the fraction $(R_{max}-R_{min})/(R_{circ}-R_{min})$.

In the next step, a value $F_{min}$ may be determined as the minimum of $F(\theta)$ and 1 wherein finally the boundary perimeter may be calculated as $R_{blend}(\theta)=R_{min}(\theta)+F_{min}*(R_{circ}(\theta)-R_{min}(\theta))$.

This means that if the value of $F_{min}$ is value 1, $R_{circ}$ may be used as the blending by a boundary. Otherwise, the final shape can be some percentage of the difference between the radially enlarged smoothed frame shape 51 in FIG. 25, and the closer $R_{max}$ is to $R_{min}$, the closer the actual boundary may be to the smoothed frame shape.

Figure 24:
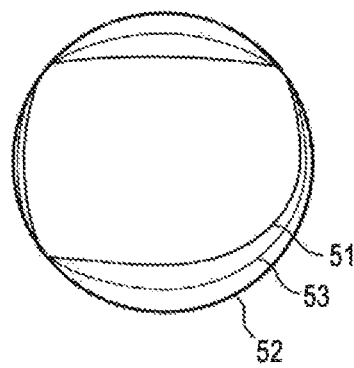
FIG. 24 illustrates different boundary perimeters of the prescription zone.

FIG. 24 illustrates an example of a radially enlarged smoothed frame shape 51, the boundary perimeter corresponding to the circle $R_{circ}$ denoted by 52 and the calculated boundary perimeter $R_{blend}$ 53 that results in the case of $F_{min}=0.5$.

Figure 25:
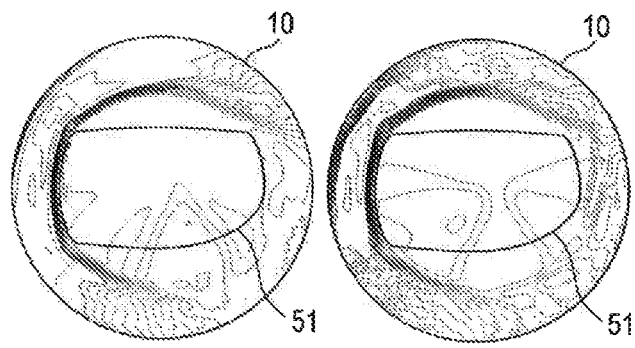
FIG. 25 shows a diagram of the surface mean power and cylinder corresponding thereto.

FIG. 25 shows a diagram of the surface mean power (left graph) and surface cylinder power (right graph) of the final surface calculated for an example back surface progressive lens for the radially enlarged frame shape shown in FIG. 24. For this exemplary embodiment, the calculated $F_{min}$ equals 0.65 for the boundary of the prescription zone.

An advantage of selecting such boundary perimeters is that the variation in sagittal curvature in the determined final cutting surface may be reduced or avoided thereby supporting smoothing the cutting surface. So for instance, referring to the exemplary embodiment shown in FIG. 25 the sagittal curvature in the blended region is smoother than if the blend boundary followed the frame shape which has sharp corners. More generally speaking it is proposed to machine a final cutting surface in a turning process and the final cutting surface may be determined under the condition of minimizing variations in sagittal curvature within the non-prescription blending zone.

Figure 26:
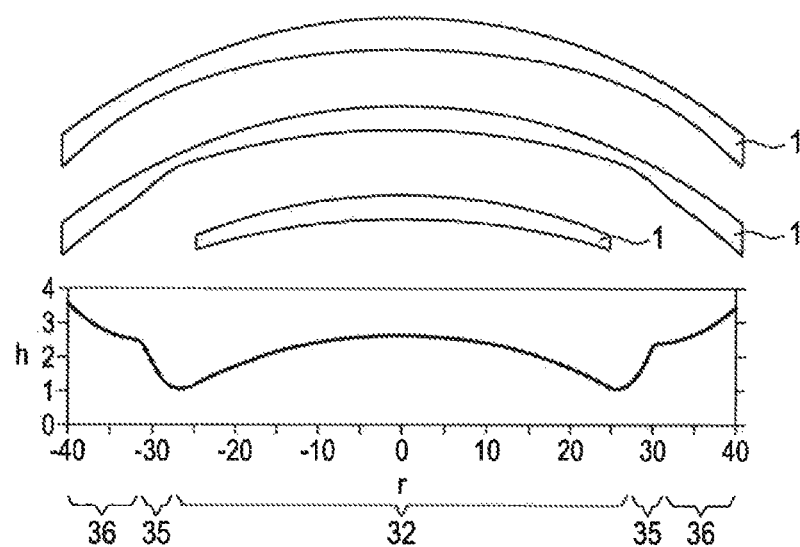
FIG. 26 shows a lens cross sectional view along a meridian during different processing stages.
Figure 27:
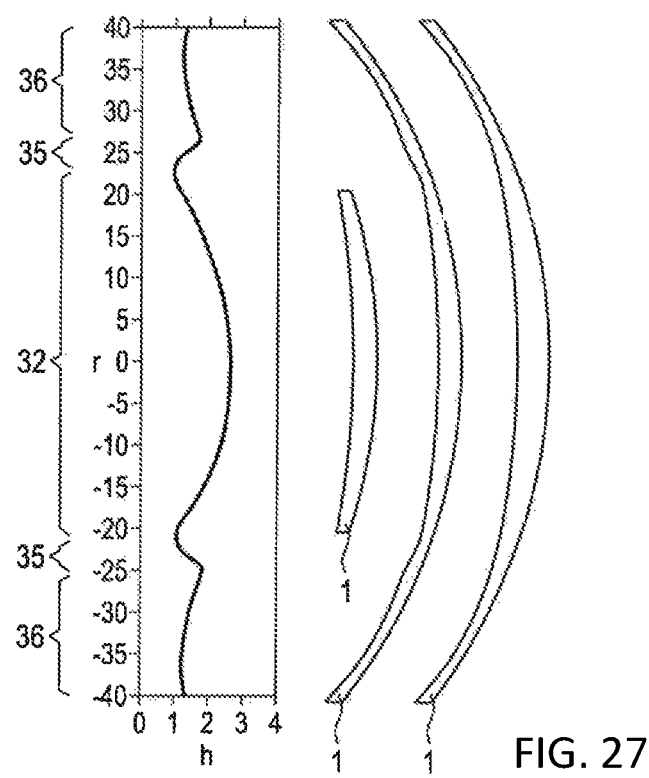
FIG. 27 show a lens cross sectional view along the meridian perpendicular to the meridian of the spectacle lens in FIG. 26 during different processing stages.

FIGS. 26 and 27 show a further exemplary embodiment of a spectacle lens 1 in various processing stages. Referring to FIG. 26, the top cross section illustrates the spectacle lens 1 after machining the intermediate cutting surface on the back surface of the lens in the primary cutting phase. The second cross section from the top illustrates the shape of the spectacle lens 1 after machining the final cutting surface on the back surface of the lens in the secondary cutting phase. The third cross section from the top illustrates the cut out spectacle lens 1 after edging wherein the side portions are reduced to the prescription zone. Hence, advantageously, a full diameter lens blank can be used and the outer diameter can be maintained throughput various manufacturing steps such as coating which greatly improves automated handling of the lens. FIG. 27 shows a corresponding graph in the perpendicular meridian wherein the different stages are shown from right to left.

It should be noted that the intermediate cutting surface is so named because it acts as an intermediary between the initial semi-finished puck or lens blank surface and the final surface of the finished lens; at least regarding the prescription zone, the intermediate cutting surface is adapted to provide a lens thickness between the lens thickness of the lens blank and the lens thickness after machining the final cutting surface. The intermediate cutting surface is typically flat enough in curvature to cover the full surface of the lens blank to be cut using a fast milling tool. Typically, the shape of the final cutting surface in the non-prescription blending zone surrounding the prescription zone may be steeper than the intermediate cutting surface. Hence, this ensures that the final cutting surface and the intermediate cutting surface intersect, and it is no longer necessary to machine the final cutting surface outside the intersection curve.

After both cutting phases, a lens shape may thus be achieved having three distinct zones on the back surface namely (i) the prescription zone 32 (cf. FIG. 20), in which the machined back surface together with the front surface fulfills the ophthalmic prescription of the user, and wherein a boundary perimeter of the prescription zone encloses a perimeter of the spectacle frame; (ii) a non-prescription blending zone 35 (cf. FIG. 20) surrounding the prescription zone; and (iii) a non-prescription peripheral zone 36 (cf. FIG. 20) surrounding the non-prescription blending zone; wherein a transition between the non-prescription blending zone and the non-prescription peripheral zone is at least in part discontinuous in a radial direction. It should be noted that at the point of this discontinuity, a slope of the non-prescription blending zone may be steeper than a slope of the non-prescription peripheral zone.

Further examples and exemplary embodiments are described in the following clauses:

Clause 1. A manufacturing method (100) for manufacturing a spectacle lens (1), the method comprising the steps of:
  obtaining prescription data descriptive of an ophthalmic prescription of a user in the plus prescription range (101);
  obtaining frame data descriptive of a perimeter of a spectacle frame in which the lens is to be mounted (102);
  providing a lens blank (5) having a convex front surface (3) and a back surface (4) (103);
  determining a final cutting surface (7) to be machined on the back surface (4) of the lens blank in a secondary cutting phase (104);
  determining an intermediate cutting surface (8) to be machined on the back surface of the lens blank in a primary cutting phase (105);
  wherein the final cutting surface (7) comprises
    a prescription zone (32), in which the final cutting surface (7) together with the front surface (3) fulfills the ophthalmic prescription of the user; and wherein a boundary perimeter of the prescription zone encloses the perimeter of the spectacle frame (20); and
    a non-prescription blending zone (35) surrounding the prescription zone; in which the final cutting surface (7) together with the front surface (3) provides at least a predetermined minimum thickness of the spectacle lens;
  wherein the intermediate cutting surface (8) is determined based on the final cutting surface (7); wherein a maximum curvature of the intermediate cutting surface is smaller than a maximum curvature of the final cutting surface; and wherein a lens thickness provided by the intermediate cutting surface exceeds a lens thickness provided by the final cutting surface at least within the prescription zone (32);
  machining the intermediate cutting surface (8) on the back surface of the lens blank in the primary cutting phase (106); and
  machining the final cutting surface (7) on the back surface of the lens blank in the secondary cutting phase (107).

Clause 2. The manufacturing method according to clause 1, characterized in that the intermediate cutting surface (8) is one of a toric surface, an aspheric surface or a smoothed final cutting surface.

Clause 3. The manufacturing method according to any of the preceding clauses, characterized in that for at least one point of the final cutting surface (7), a meridian curvature of the intermediate cutting surface (8) correspond to a meridian curvature of the final cutting surface.

Clause 4. The manufacturing method according to any of the preceding clauses, characterized in that the intermediate cutting surface (8) is adapted to be machined with a primary coarse cutting tool and the final cutting surface is adapted to be machined with a secondary fine cutting tool.

Clause 5. The manufacturing method according to any of the preceding clauses, characterized in that a surface height difference between the intermediate cutting surface (8) and the final cutting surface (7) to be machined in the prescription zone (32) is within a predetermined thickness range.

Clause 6. The manufacturing method according to any of the preceding clauses, characterized in that determining the final or intermediate cutting surface (7, 8) comprises incorporating a prism (12) into the final or intermediate cutting surface.

Clause 7. The manufacturing method according to any of the preceding clauses, characterized in that the final cutting surface is determined under the boundary condition of minimizing a maximum thickness of the spectacle lens (1) in the prescription zone (32) while achieving a predetermined thickness range along the boundary perimeter of the prescription zone.

Clause 8. The manufacturing method according to any of the preceding clauses, characterized in that the final cutting surface (7) and the intermediate cutting surface (8) intersect outside of the prescription zone (32) along an intersection curve (22); and wherein the final cutting surface is machined only inside a typically circular diameter that encompasses the intersection curve (23).

Clause 9. The manufacturing method according to any of the preceding clauses, characterized in that the final cutting surface (7) in the non-prescription blending zone (35) is steeper than the intermediate cutting surface (8) in at least one point of the non-prescription blending zone.

Clause 10. The manufacturing method according to any of the preceding clauses, characterized in that the boundary perimeter comprising the frame perimeter (20) corresponds to a smoothed frame perimeter, typically a circle or ellipse encompassing the frame perimeter.

Clause 11. The manufacturing method according to any of the preceding clauses, characterized by centering the prescription zone (32) on the lens blank (5).

Clause 12. The manufacturing method according to any of the preceding clauses, characterized by machining the final cutting surface (7) in a turning process and wherein the final cutting surface is determined under the condition of minimizing variations in sagittal curvature within the non-prescription blending zone (35).

Clause 13. A spectacle lens (1) comprising:
a convex front surface (3); and
a back surface (4);
wherein the back surface comprises
(i) a prescription zone (32), in which the back surface (4) together with the front surface (3) fulfills an ophthalmic prescription of the user; and wherein a boundary perimeter of the prescription zone encloses a perimeter of a spectacle frame (20);
(ii) a non-prescription blending zone (35) surrounding the prescription zone; and
(iii) a non-prescription peripheral zone (36) surrounding the non-prescription blending zone (35);
wherein a transition between the non-prescription blending zone (35) and the non-prescription peripheral zone (36) is at least in part discontinuous in surface slope in a radial direction.

Clause 14. A computer implemented method (100) for designing a spectacle lens (1), the method comprising the steps of:
obtaining prescription data descriptive of an ophthalmic prescription of a user in the plus prescription range (101);
obtaining frame data descriptive of a perimeter of a spectacle frame in which the lens is to be mounted (102);
determining a final cutting surface (7) to be machined on the back surface of a lens blank in a secondary cutting phase (104);
determining an intermediate cutting surface (8) to be machined on the back surface of the lens blank in a primary cutting phase (105);
wherein the final cutting surface (7) comprises
a prescription zone (32), in which the final cutting surface together with the front surface fulfills the ophthalmic prescription of the user; and wherein a boundary perimeter of the prescription zone encloses the perimeter of the spectacle frame; and
a non-prescription blending zone surrounding the prescription zone; in which the final cutting surface together with the front surface provides at least a predetermined minimum thickness of the spectacle lens;
wherein the intermediate cutting surface (8) is determined based on the final cutting surface (7); wherein a maximum curvature of the intermediate cutting surface is smaller than a maximum curvature of the final cutting surface; and wherein a lens thickness provided by the intermediate cutting surface exceeds a lens thickness provided by the final cutting surface at least within the prescription zone.

Clause 15. A computer program comprising program code means for causing a computer to carry out the steps of the method (70) as described in clause 14 when the computer program is carried out on the computer.

It has been found that a further advantage of not having to cut the final cutting surface in the peripheral zone outside an intersection curve, wherein the final cutting surface and the intermediate cutting surface intersect, is that a problem that might otherwise arise regarding such curvature variations in the final spectacle lens surface at larger diameter may be reduced or avoided combining with the need for slower RPM the larger the cutting diameter which would have led to an extra-slow process time. Hence, an amount by which the cutting process is slowed may be reduced.

While the invention has been illustrated and described in detail in the drawings and foregoing description, such illustration and description are to be considered illustrative or exemplary and not restrictive; the disclosure is not limited to the disclosed exemplary embodiments. Other variations to the disclosed exemplary embodiments can be understood and effected by those skilled in the art in practicing the claimed invention, from a study of the drawings, the disclosure, and the appended claims.

In the claims, the reference to a lens "in the plus prescription range" is intended to cover a lens which has an optical through power being positive in at least one meridian in at least one region of the lens. It therefore covers lenses having both sphere and cylinder components, and progressive lenses. It also includes minus Rx progressive lenses where the addition power is greater than the distance prescription.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A manufacturing method for manufacturing a spectacle lens, the method comprising:
obtaining prescription data descriptive of an ophthalmic prescription of a user in a plus prescription range;
providing a lens blank having a convex front surface and a back surface;
determining a final cutting surface to be machined on the back surface of the lens blank in a secondary cutting phase;
obtaining frame data descriptive of a perimeter of a spectacle frame in which the lens is to be mounted;
determining an intermediate cutting surface to be machined on the back surface of the lens blank in a primary cutting phase, wherein the intermediate cutting surface is different from the final cutting surface;
wherein the final cutting surface includes:
a prescription zone in which the final cutting surface together with the front surface fulfills the ophthalmic prescription of the user, wherein a boundary perimeter of the prescription zone encloses the perimeter of the spectacle frame; and a non-prescription blending zone surrounding the prescription zone in which the final cutting surface together with the front surface provides at least a predetermined minimum thickness of the spectacle lens;

wherein the intermediate cutting surface is determined based on the final cutting surface; wherein a maximum curvature of the intermediate cutting surface is smaller than a maximum curvature of the final cutting surface; and wherein a lens thickness provided by the intermediate cutting surface exceeds a lens thickness provided by the final cutting surface at least within the prescription zone;

machining the intermediate cutting surface on the back surface of the lens blank in the primary cutting phase; and machining the final cutting surface on the back surface of the lens blank in the secondary cutting phase.

2. A manufacturing method for manufacturing a spectacle lens, the method comprising:

obtaining prescription data descriptive of an ophthalmic prescription of a user in a plus prescription range;

providing a lens blank having a convex front surface and a back surface;

determining a final cutting surface to be machined on the back surface of the lens blank in a secondary cutting phase;

obtaining frame data descriptive of a perimeter of a spectacle frame in which the lens is to be mounted;

determining an intermediate cutting surface to be machined on the back surface of the lens blank in a primary cutting phase, wherein the intermediate cutting surface is different from the final cutting surface;

wherein the final cutting surface includes:

a prescription zone in which the final cutting surface together with the front surface fulfills the ophthalmic prescription of the user, wherein a boundary perimeter of the prescription zone encloses the perimeter of the spectacle frame; and a non-prescription blending zone surrounding the prescription zone in which the final cutting surface together with the front surface provides at least a predetermined minimum thickness of the spectacle lens, and wherein the non-prescription blending zone provides a transition from the prescription zone to a remainder of the intermediate cutting surface machined on the back surface;

wherein the intermediate cutting surface is determined based on the final cutting surface; wherein a maximum curvature of the intermediate cutting surface is smaller than a maximum curvature of the final cutting surface; and wherein a lens thickness provided by the intermediate cutting surface exceeds a lens thickness provided by the final cutting surface at least within the prescription zone;

machining the intermediate cutting surface on the back surface of the lens blank in the primary cutting phase; and machining the final cutting surface on the back surface of the lens blank in the secondary cutting phase.

3. The manufacturing method according to claim 1, wherein the intermediate cutting surface is a smoothed final cutting surface.

4. The manufacturing method according to claim 1, wherein—for at least one point of the final cutting surface—a meridian curvature of the intermediate cutting surface correspond to a meridian curvature of the final cutting surface.

5. The manufacturing method according to claim 1, wherein the intermediate cutting surface is configured to be machined with a primary coarse cutting tool and the final cutting surface is configured to be machined with a secondary fine cutting tool.

6. The manufacturing method according to claim 1, wherein a surface height difference between the intermediate cutting surface and the final cutting surface to be machined in the prescription zone is within a predetermined thickness range.

7. The manufacturing method according to claim 1, wherein determining the final or intermediate cutting surface comprises incorporating a prism into the final or intermediate cutting surface.

8. The manufacturing method according to claim 1, wherein the final cutting surface is determined under the boundary condition of minimizing a maximum thickness of the spectacle lens in the prescription zone while achieving a predetermined thickness range along the boundary perimeter of the prescription zone.

9. The manufacturing method according to claim 1, wherein the final cutting surface and the intermediate cutting surface intersect outside of the prescription zone along an intersection curve, and wherein the final cutting surface is machined only inside the intersection curve.

10. The manufacturing method according to claim 1, wherein the final cutting surface in the non-prescription blending zone is steeper than the intermediate cutting surface in at least one point of the non-prescription blending zone.

11. The manufacturing method according to claim 1, wherein the boundary perimeter comprising the frame perimeter corresponds to a smoothed frame perimeter.

12. The manufacturing method according to claim 1, further comprising centering the prescription zone on the lens blank.

13. The manufacturing method according to claim 1, further comprising machining the final cutting surface in a turning process, wherein the final cutting surface is determined under the condition of minimizing variations in sagittal curvature within the non-prescription blending zone.

14. A computer implemented method for designing a spectacle lens, the method comprising:

obtaining prescription data descriptive of an ophthalmic prescription of a user in the plus prescription range;

determining a final cutting surface to be machined on the back surface of a lens blank in a secondary cutting phase;

obtaining frame data descriptive of a perimeter of a spectacle frame in which the lens is to be mounted;

determining an intermediate cutting surface to be machined on the back surface of the lens blank in a primary cutting phase, wherein the intermediate cutting surface is different from the final cutting surface;

wherein the final cutting surface comprises a prescription zone in which the final cutting surface together with the front surface fulfills the ophthalmic prescription of the user, wherein a boundary perimeter of the prescription zone encloses the perimeter of the spectacle frame; and a non-prescription blending zone surrounding the prescription zone in which the final cutting surface together with the front surface provides at least a predetermined minimum thickness of the spectacle lens;

wherein the intermediate cutting surface is determined based on the final cutting surface, wherein a maximum curvature of the intermediate cutting surface is smaller than a maximum curvature of the final cutting surface, and wherein a lens thickness provided by the intermediate cutting surface exceeds a lens thickness provided by the final cutting surface at least within the prescription zone.

15. A computer program comprising program code means for causing a computer to carry out the method as claimed in claim 14 when the computer program is executed on the computer.

\* \* \* \* \*